(12) United States Patent
Farag

(10) Patent No.: US 12,701,588 B2
(45) Date of Patent: Aug. 4, 2026

(54) METHOD AND APPARATUS FOR SL POSITIONING WITHIN NETWORK COVERAGE

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 18/148,310

(22) Filed: Dec. 29, 2022

(65) Prior Publication Data

US 2023/0232429 A1 Jul. 20, 2023

Related U.S. Application Data

(60) Provisional application No. 63/299,763, filed on Jan. 14, 2022.

(51) Int. Cl.
| | |
|---|---|
| *H04W 72/25* | (2023.01) |
| *H04W 24/10* | (2009.01) |
| *H04W 72/232* | (2023.01) |

(52) U.S. Cl.
CPC ........... *H04W 72/25* (2023.01); *H04W 24/10* (2013.01); *H04W 72/232* (2023.01)

(58) Field of Classification Search
CPC ... H04W 72/25; H04W 24/10; H04W 72/232; H04W 4/44; H04W 92/18; H04W 64/00; H04W 72/02; H04W 72/0446; H04W 72/0453; H04L 5/0051; H04L 5/0094; H04L 5/0048; H04L 5/0053; H04L 27/26025; H04L 27/2605; H04L 5/0044; H04L 5/0039; H04L 5/0064
See application file for complete search history.

(56) References Cited

U.S. PATENT DOCUMENTS

| | | | |
|---|---|---|---|
| 11,974,335 B2 * | 4/2024 | Bao ...................... | H04L 67/535 |
| 2021/0297206 A1 | 9/2021 | Manolakos et al. | |
| 2021/0410178 A1 | 12/2021 | Wang et al. | |

(Continued)

FOREIGN PATENT DOCUMENTS

| | | |
|---|---|---|
| WO | 2021057175 A1 | 4/2021 |
| WO | 2021086093 A1 | 5/2021 |

(Continued)

OTHER PUBLICATIONS

"5G; NR; Physical channels and modulation (3GPP TS 38.211 version 16.7.0 Release 16)", ETSI TS 138 211 V16.7.0, Oct. 2021, 138 pages.

(Continued)

*Primary Examiner* — Brian T O Connor

(57) ABSTRACT

Methods and apparatuses for sidelink (SL) positioning within network coverage in a wireless communication system. A method of operating a user equipment (UE) includes receiving, via a downlink (DL) interface, configuration information for a sidelink (SL) positioning reference signal (PRS) and determining, based on the configuration information, resources for the SL PRS on a SL interface. The method further includes transmitting, via the SL interface, an indication of the resources for the SL PRS and transmitting the SL PRS on the indicated resources.

12 Claims, 18 Drawing Sheets

700

Network configures UE with resources to use for:
1. SL positioning reference signals
2. Reporting of SL positioning measurements Network (gNB)

UE within network coverage

(56) References Cited

U.S. PATENT DOCUMENTS

| | | | |
|---|---|---|---|
| 2022/0201774 A1* | 6/2022 | Bao ........................ | H04W 72/56 |
| 2022/0321293 A1 | 10/2022 | Ren | |
| 2022/0385423 A1 | 12/2022 | Ko et al. | |
| 2022/0393820 A1* | 12/2022 | Keating ................ | H04W 76/14 |
| 2023/0224121 A1* | 7/2023 | Ganesan ............... | H04L 5/0051 |
| | | | 455/456.1 |
| 2023/0309066 A1* | 9/2023 | Ganesan ............... | H04W 72/02 |
| 2024/0137899 A1* | 4/2024 | Thomas ................ | H04W 64/00 |
| 2024/0163832 A1* | 5/2024 | Wang ...................... | H04W 4/46 |
| 2024/0188153 A1* | 6/2024 | Hoang .................. | G01S 5/0072 |
| 2024/0236917 A9* | 7/2024 | Thomas ................ | G01S 13/876 |

FOREIGN PATENT DOCUMENTS

| | | | |
|---|---|---|---|
| WO | 2021092813 A1 | 5/2021 | |
| WO | 2021240479 A1 | 12/2021 | |

OTHER PUBLICATIONS

"5G; NR; Multiplexing and channel coding (3GPP TS 38.212 version 16.7.0 Release 16)", ETSI TS 138 212 V16.7.0, Oct. 2021, 157 pages.

"5G; NR; Physical layer procedures for control (3GPP TS 38.213 version 16.7.0 Release 16)", ETSI TS 138 213 V16.7.0, Oct. 2021, 191 pages.

"5G; NR; Physical layer procedures for data (3GPP TS 38.214 version 16.7.0 Release 16)", ETSI TS 138 214 V16.7.0, Oct. 2021, 176 pages.

"5G; NR; Physical layer measurements (3GPP TS 38.215 version 16.4.0 Release 16)", ETSI TS 138 215 V16.4.0, Jan. 2021, 31 pages.

"5G; NR; Medium Access Control (MAC) protocol specification (3GPP TS 38.321 version 16.6.0 Release 16)", ETSI TS 138 321 V16.6.0, Oct. 2021, 160 pages.

"5G; NR; Radio Resource Control (RRC); Protocol specification (3GPP TS 38.331 version 16.6.0 Release 16)", ETSI TS 138 331 V16.6.0, Oct. 2021, 948 pages.

"LTE; Evolved Universal Terrestrial Radio Access (E-UTRA); Physical layer procedures (3GPP TS 36.213 version 16.7.1 Release 16)", ETSI TS 136 213 V16.7.1, Oct. 2021, 581 pages.

International Search Report and Written Opinion issued Apr. 18, 2023 regarding International Application No. PCT/KR2023/000382, 8 pages.

Extended European Search Report issued Apr. 9, 2025 regarding Application No. 23740416.5, 9 pages.

* cited by examiner

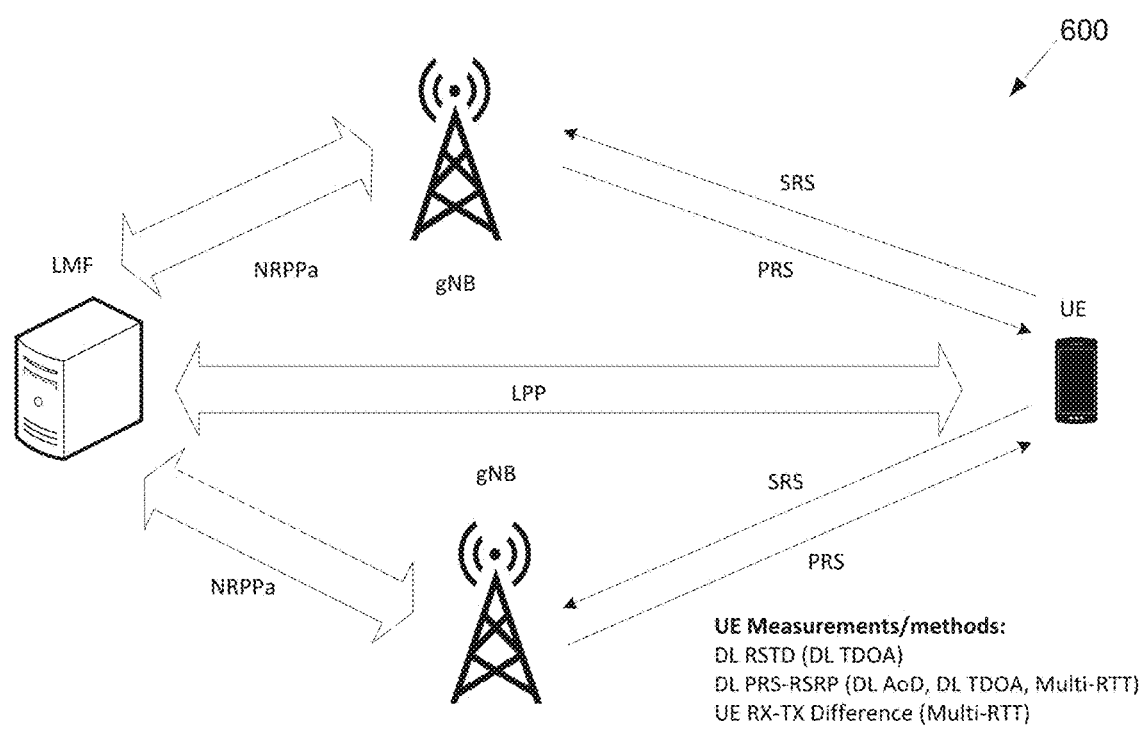

600

SRS

PRS

LMF

NRPPa gNB

UE

LPP gNB

SRS

NRPPa

PRS

UE Measurements/methods:
DL RSTD (DL TDOA)
DL PRS-RSRP (DL AoD, DL TDOA, Multi-RTT)
UE RX-TX Difference (Multi-RTT)

gNB Measurements/methods:
UL RTOA (UL TDOA)
UL AoA (UL AoA)
UL SRS-RSRP (UL TDOA, Multi-RTT)
gNB RX-TX Difference (Multi-RTT)

AoA: Angle of Arrival
AoD: Angle of Departure
LMF: Location Management Function
LPP: LTE Positioning Protocol
NRPPa: NR Positioning Protocol annex
PRS: Positioning Reference Signal

RSRP: Reference Signal Receive Power
RSTD: Reference Signal Time Difference
RTOA: Relative Time of Arrival
RTT: Round Trip Time
SRS: Sounding Reference Signal
TDOA: Time Difference of Arrival

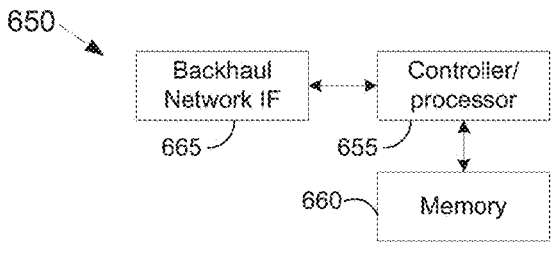

Backhaul Network IF

Controller/ processor

665

655

660

Memory

Network configures UE with resources to use for:
1. SL positioning reference signals
2. Reporting of SL positioning measurements Network (gNB)

UE within network
coverage

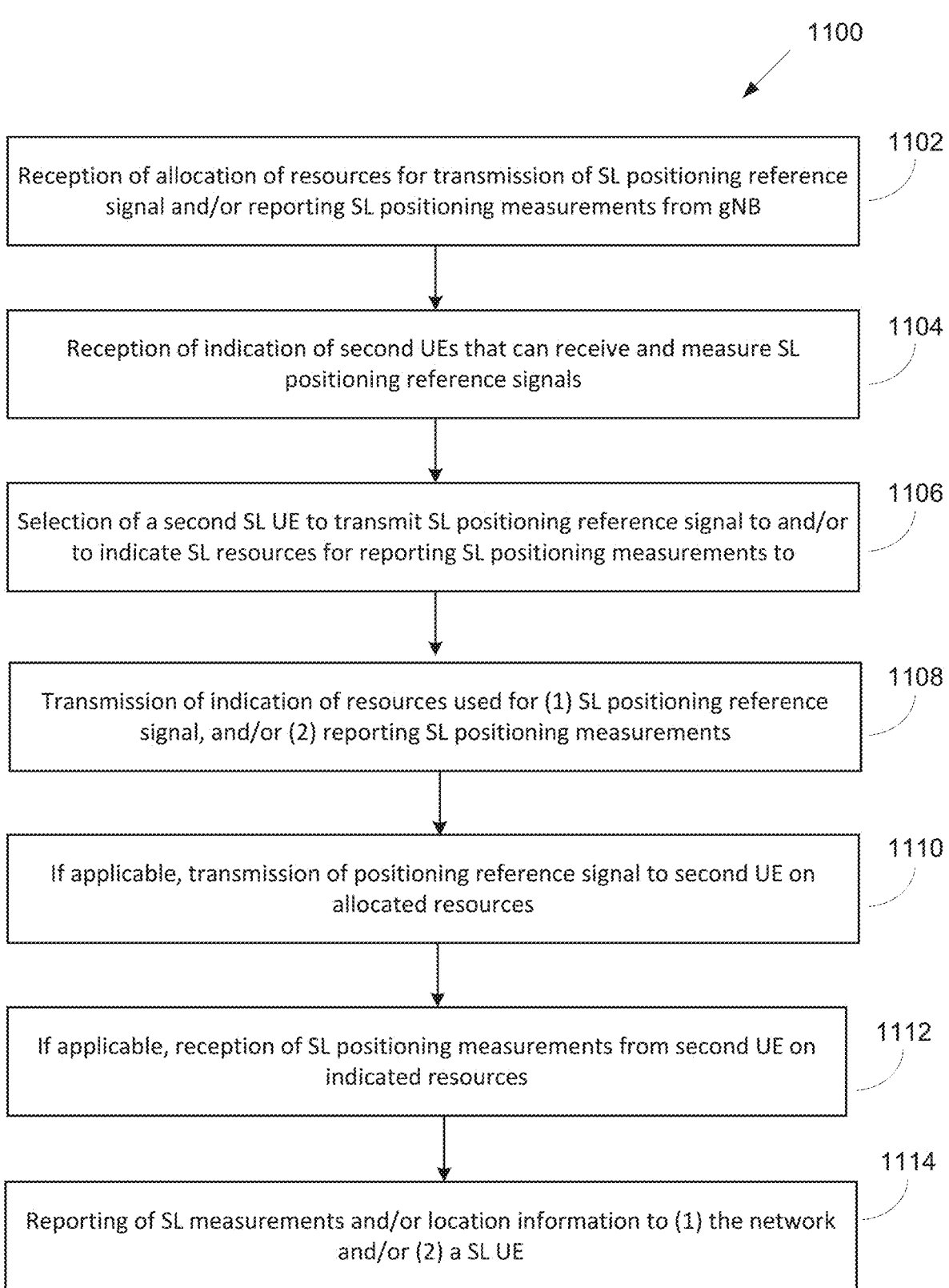

1100

1102
Reception of allocation of resources for transmission of SL positioning reference signal and/or reporting SL positioning measurements from gNB 1104
Reception of indication of second UEs that can receive and measure SL positioning reference signals 1106
Selection of a second SL UE to transmit SL positioning reference signal to and/or to indicate SL resources for reporting SL positioning measurements to 1108
Transmission of indication of resources used for (1) SL positioning reference signal, and/or (2) reporting SL positioning measurements 1110
If applicable, transmission of positioning reference signal to second UE on allocated resources 1112
If applicable, reception of SL positioning measurements from second UE on indicated resources 1114
Reporting of SL measurements and/or location information to (1) the network and/or (2) a SL UE

Reception of indication of resources used for (1) SL positioning reference signals, and/or (2) reporting SL positioning measurements — 1202

Receive and measure SL position reference signal, and if applicable determine location information — 1204

Reporting of SL measurements and/or location information to (1) a SL UE and/or (2) the network — 1206

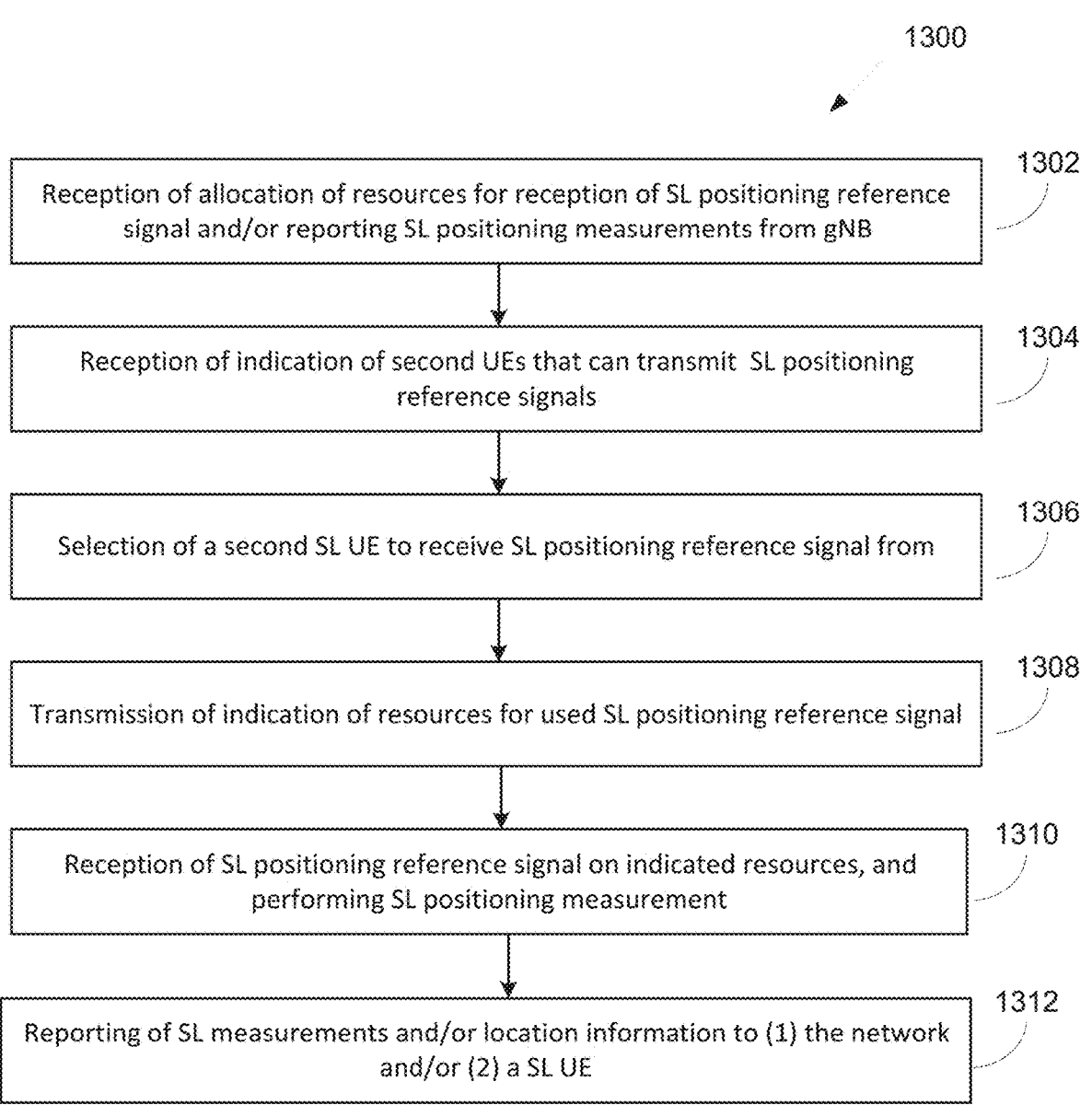

1300

Reception of allocation of resources for reception of SL positioning reference signal and/or reporting SL positioning measurements from gNB — 1302

Reception of indication of second UEs that can transmit SL positioning reference signals — 1304

Selection of a second SL UE to receive SL positioning reference signal from — 1306

Transmission of indication of resources for used SL positioning reference signal — 1308

Reception of SL positioning reference signal on indicated resources, and performing SL positioning measurement — 1310

Reporting of SL measurements and/or location information to (1) the network and/or (2) a SL UE — 1312

1402   Reception of indication of resources used for transmission of SL positioning reference signals 1404   Transmit SL positioning reference signal on indicated resources 1406   If applicable receive SL position measurements and/or location information 1408   If applicable, reporting of SL measurements and/or location information to (1) a SL UE and/or (2) the network

1500

SCI (e.g., on PSCCH or PSSCH) indicating SL positioning reference signal

Resources for SL positioning reference signal

Slot n

Slot m

1600

SCI pointing to SL positioning reference signal in a different slot

SCI (e.g., on PSCCH or PSSCH) indicating SL positioning reference signal

Resources for SL positioning reference signal

Slot n

Slot m

Figures 17, 18:
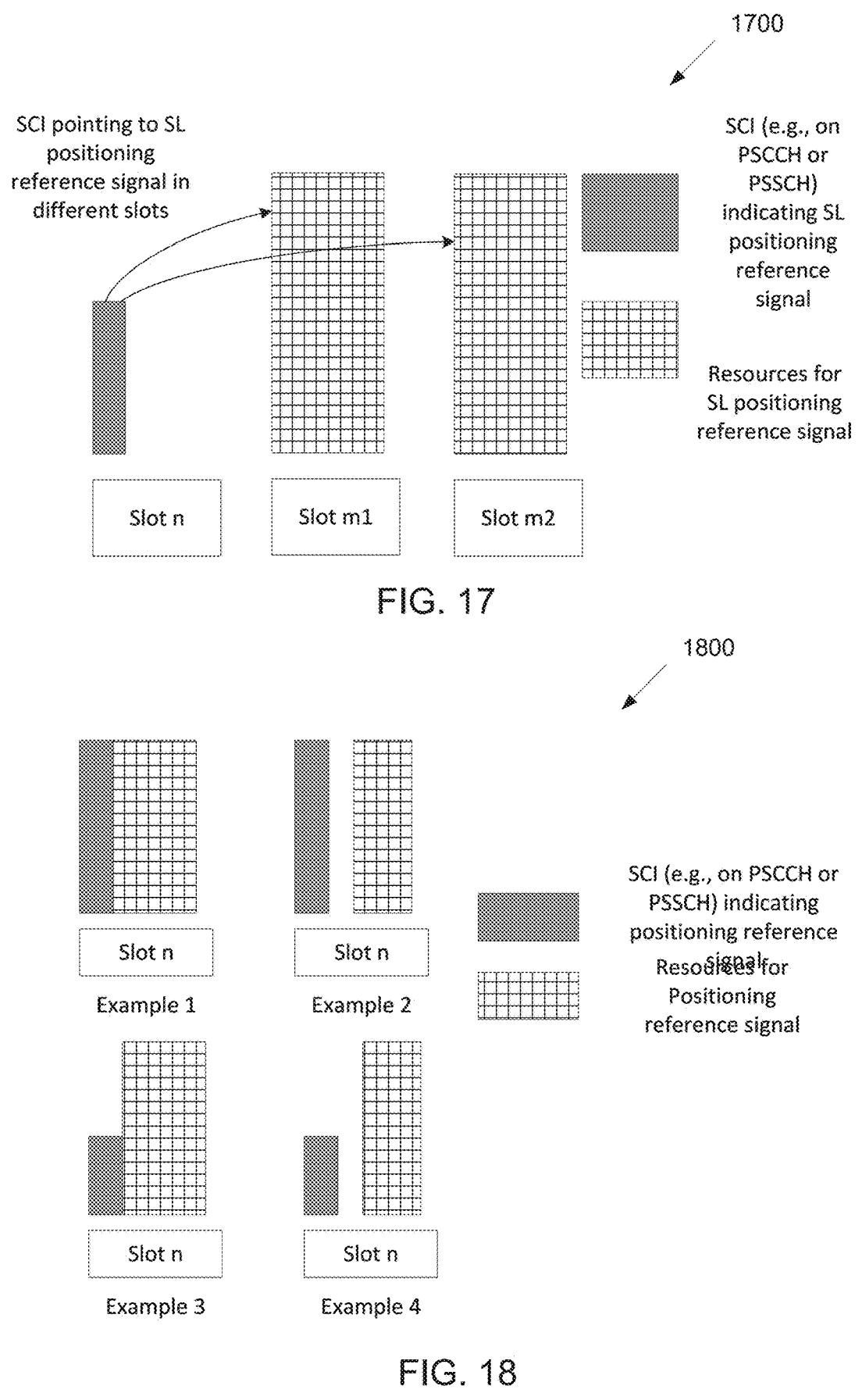

1700

SCI pointing to SL positioning reference signal in different slots

SCI (e.g., on PSCCH or PSSCH) indicating SL positioning reference signal

Resources for SL positioning reference signal

Slot n          Slot m1          Slot m2

Slot n          Slot n

Example 1       Example 2

SCI (e.g., on PSCCH or PSSCH) indicating positioning reference signal

Resources for Positioning reference signal

Slot n          Slot n

Example 3       Example 4

SCI (e.g., on PSCCH or PSSCH) indicating resources for SL positioning measurements Resources for reporting SL positioning measurements Slot n Slot m

SCI pointing to resources for reporting SL positioning measurements in a different slot

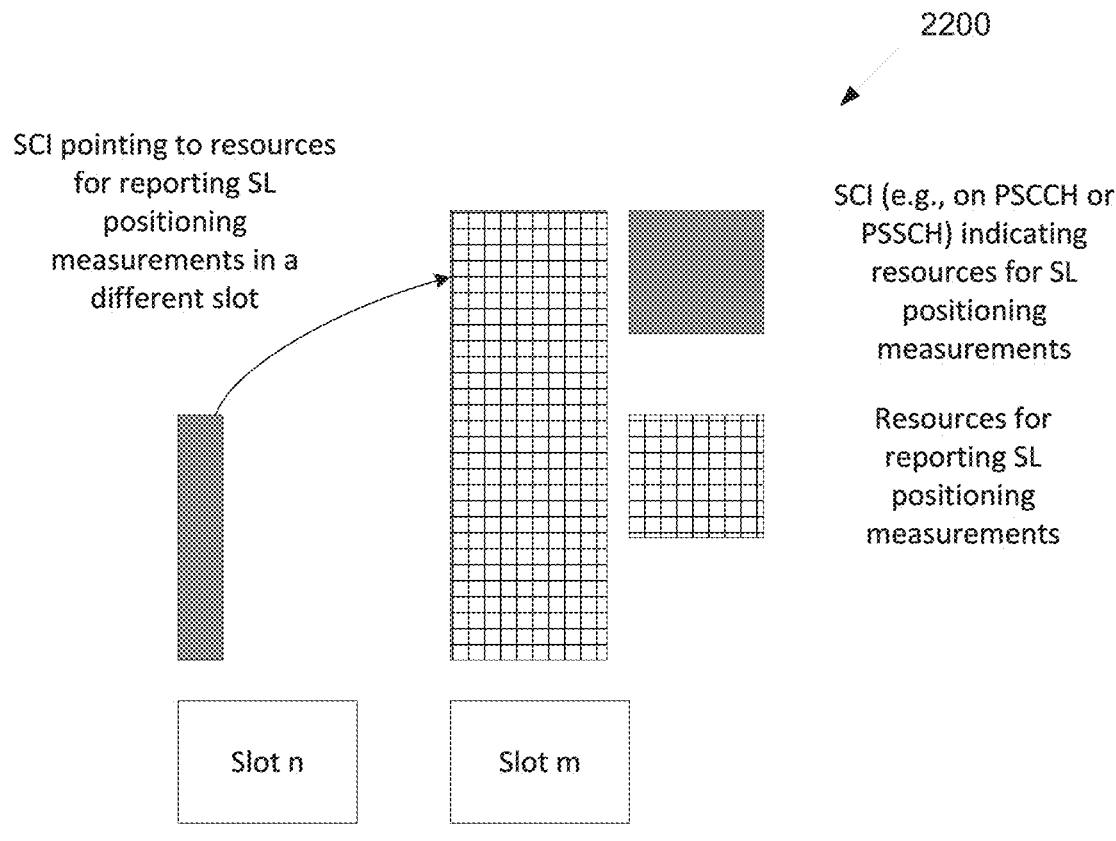

SCI (e.g., on PSCCH or PSSCH) indicating resources for SL positioning measurements Resources for reporting SL positioning measurements Slot n Slot m

FIG. 22

METHOD AND APPARATUS FOR SL POSITIONING WITHIN NETWORK COVERAGE

CROSS-REFERENCE TO RELATED APPLICATIONS AND CLAIM OF PRIORITY

The present application claims priority to U.S. Provisional Patent Application No. 63/299,763, filed on Jan. 14, 2022. The contents of the above-identified patent documents are incorporated herein by reference.

TECHNICAL FIELD

The present disclosure relates generally to wireless communication systems and, more specifically, the present disclosure relates to a sidelink (SL) positioning within network coverage in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an SL positioning within network coverage in a wireless communication system.

In one embodiment, a user equipment (UE) is provided. The UE includes a transceiver configured to receive, via a downlink (DL) interface, configuration information for a SL positioning reference signal (PRS) and a processor operably coupled to the transceiver. The processor is configured to determine, based on the configuration information, resources for the SL PRS on a SL interface. The transceiver is further configured to transmit, via the SL interface, an indication of the resources for the SL PRS and transmit the SL PRS on the indicated resources.

In another embodiment, a base station (BS) is provided. The BS includes a transceiver configured to transmit, via a downlink (DL) interface, configuration information for a SL PRS and a processor operably coupled to the transceiver. The processor is configured to determine resources for the SL PRS. The transceiver is further configured to transmit, via the DL interface, downlink control information (DCI) signaling including the resources for the SL PRS.

In yet another embodiment, a method of operating a UE is provided. The method includes receiving, via a downlink (DL) interface, configuration information for a SL PRS and determining, based on the configuration information, resources for the SL PRS on a SL interface. The method further includes transmitting, via the SL interface, an indication of the resources for the SL PRS and transmitting the SL PRS on the indicated resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A illustrates an example of positioning architecture according to embodiments of the present disclosure;

FIG. 6B illustrates an example location management function (LMF) according to embodiments of the present disclosure;

Figure 7:
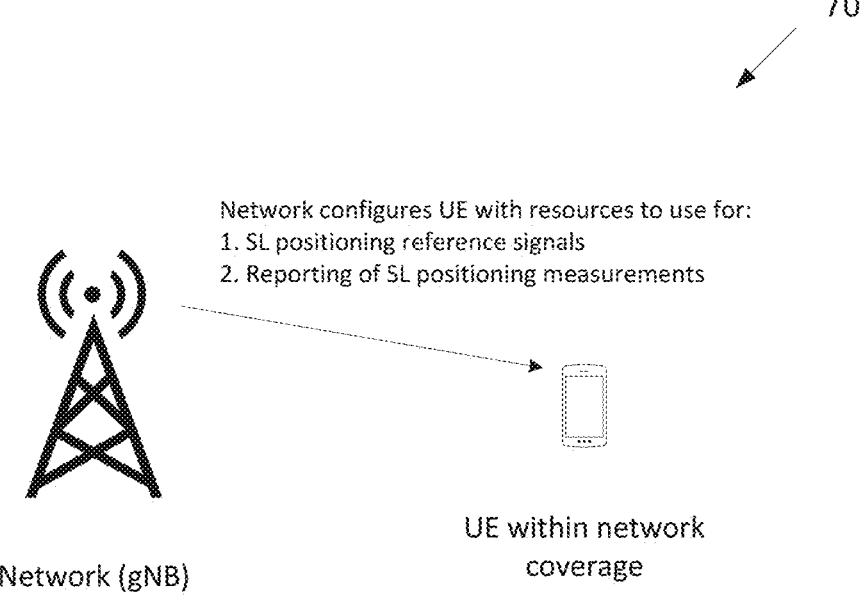
Figure 8:
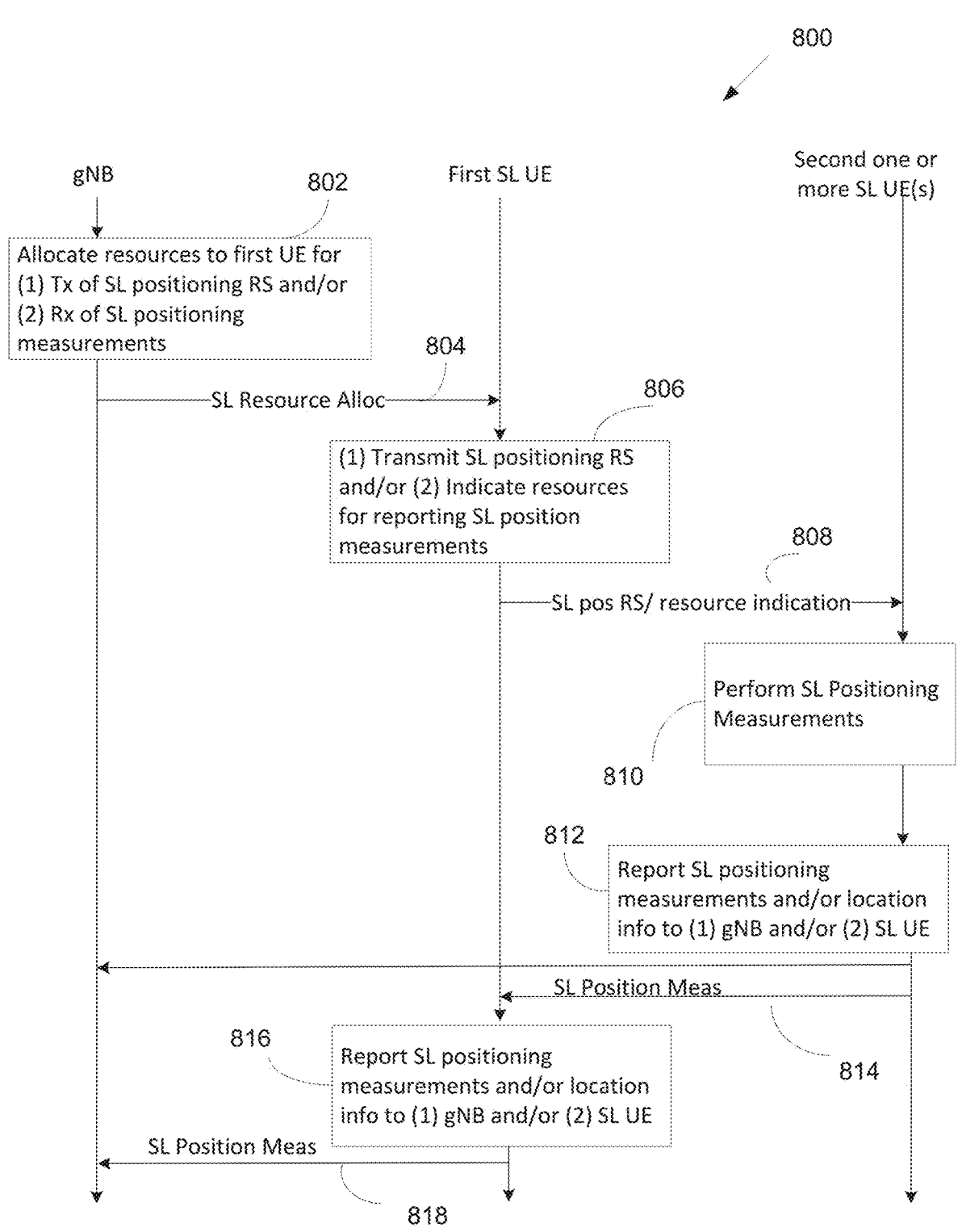
Figure 9:
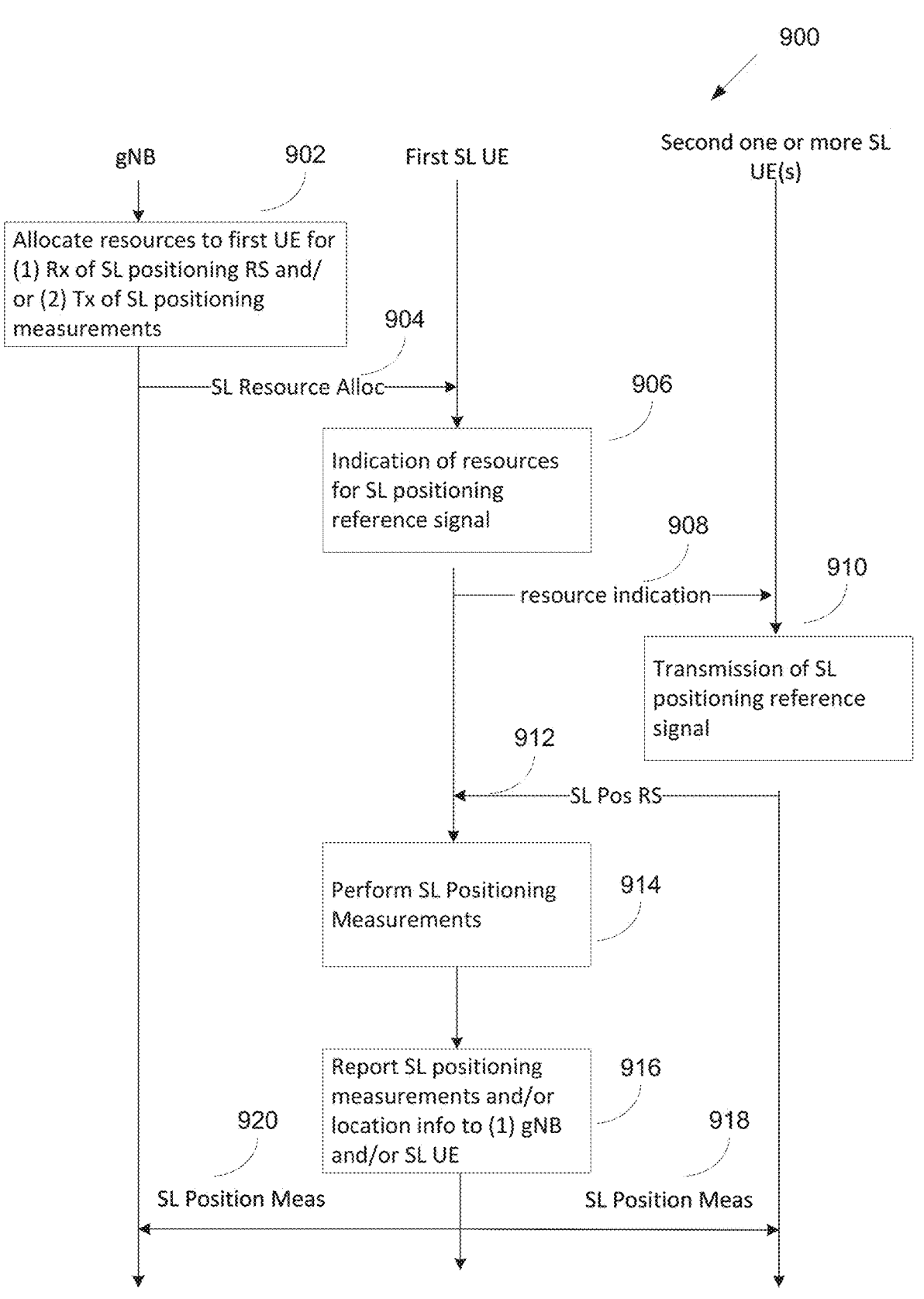
Figure 10:
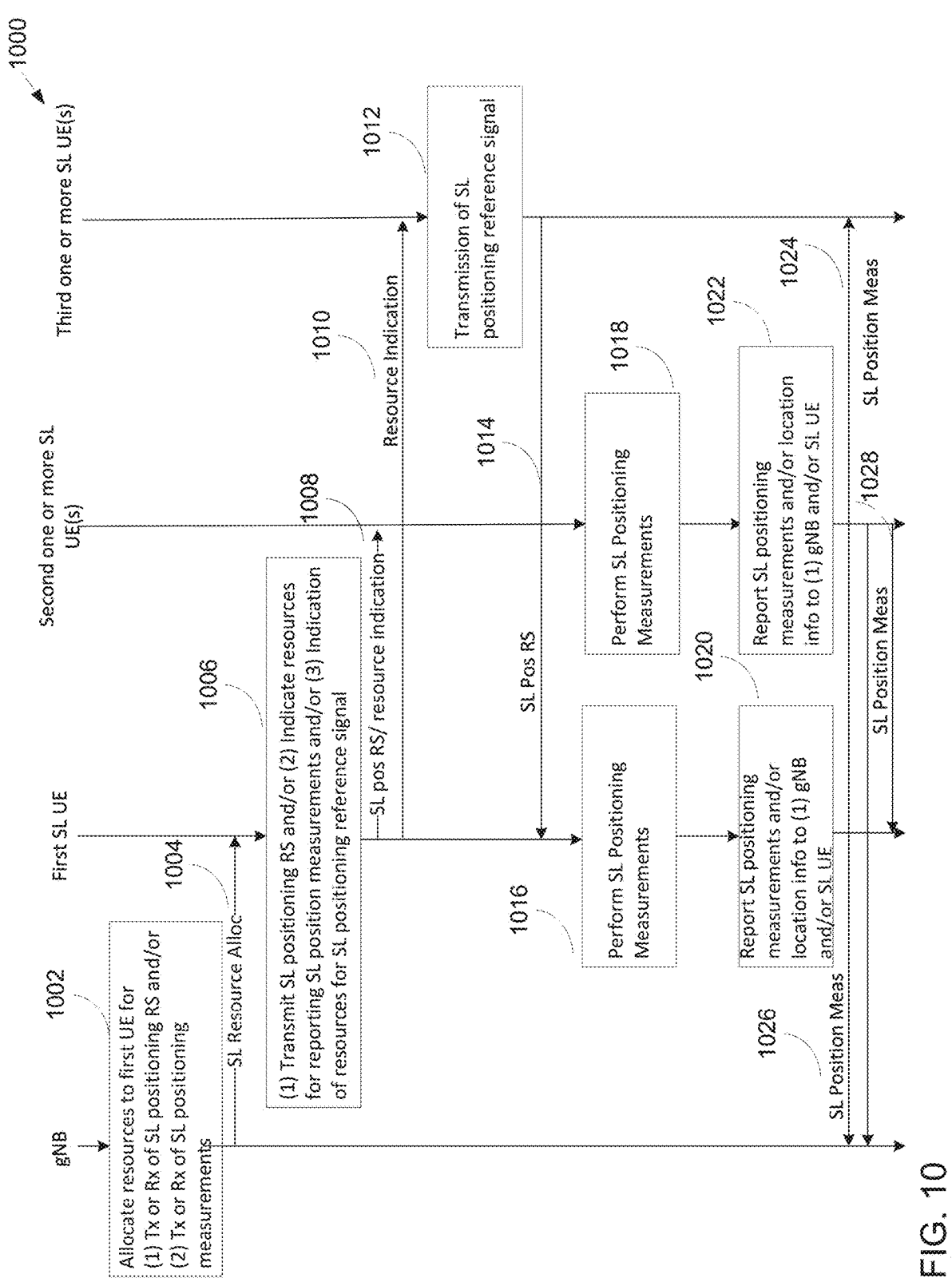
Figure 12:
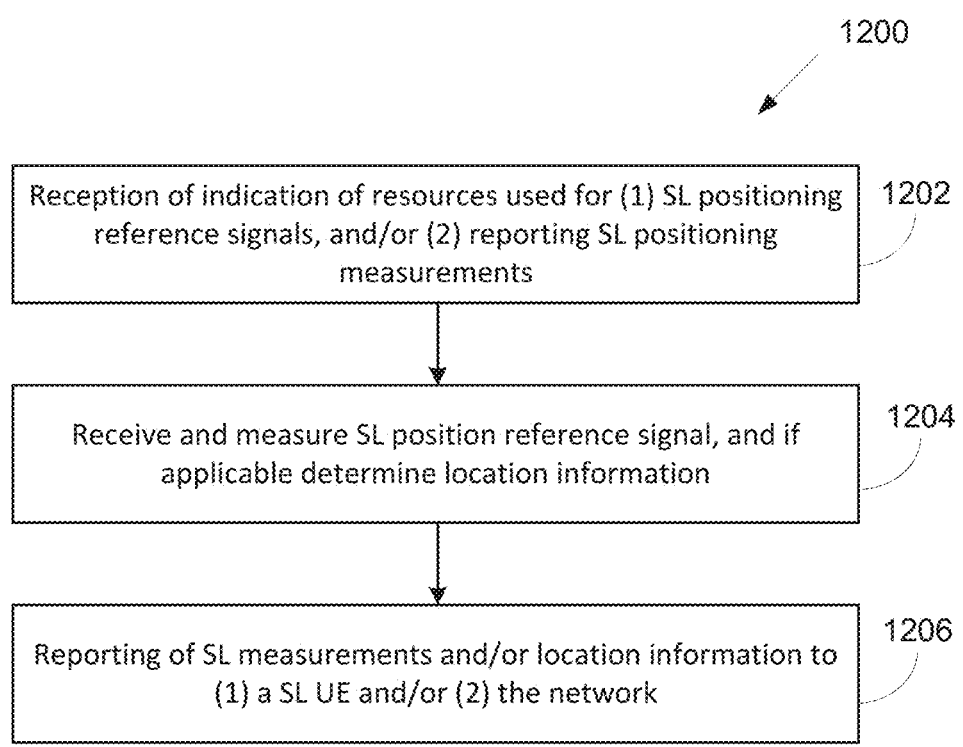
Figure 14:
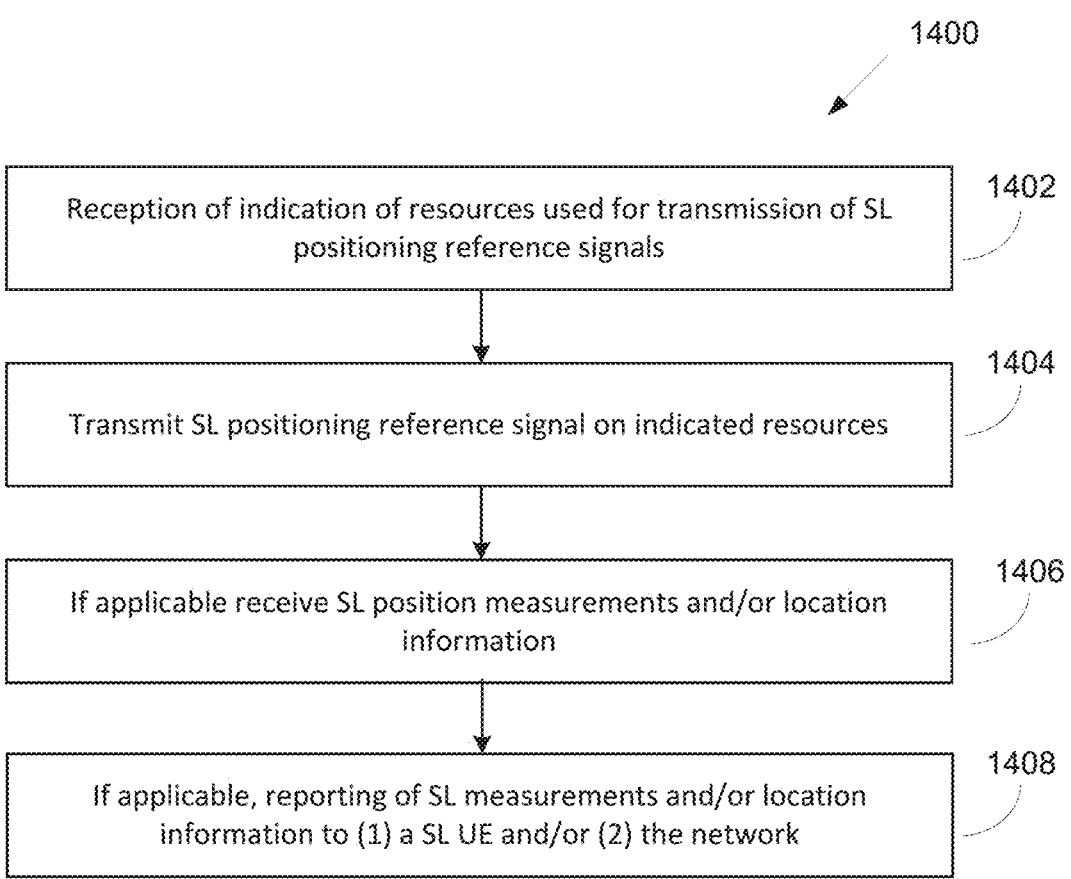
Figure 15:
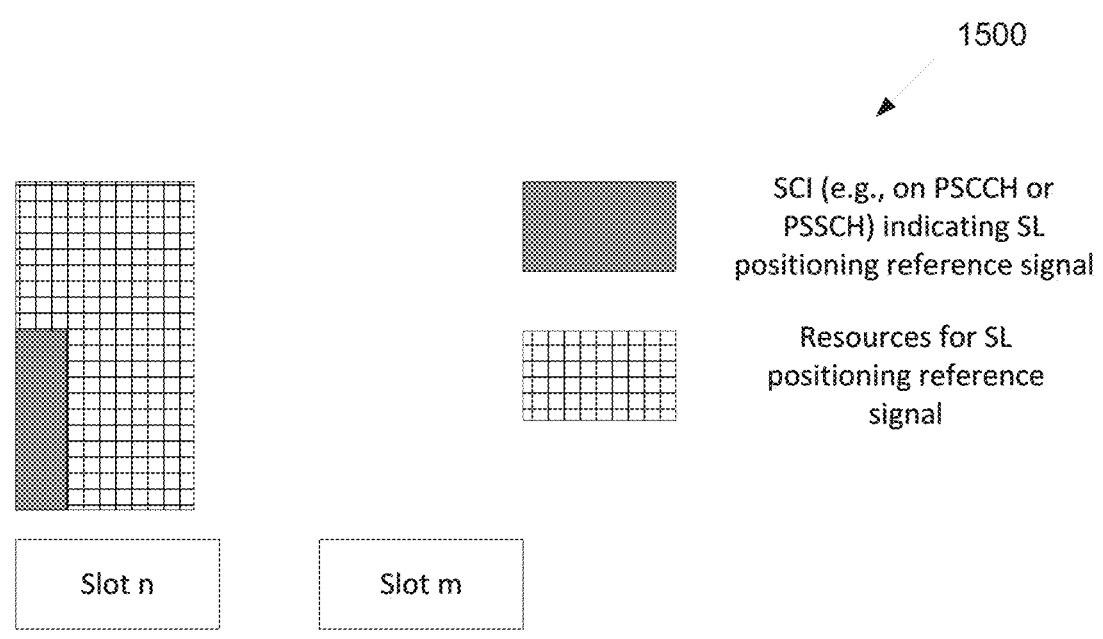
Figure 16:
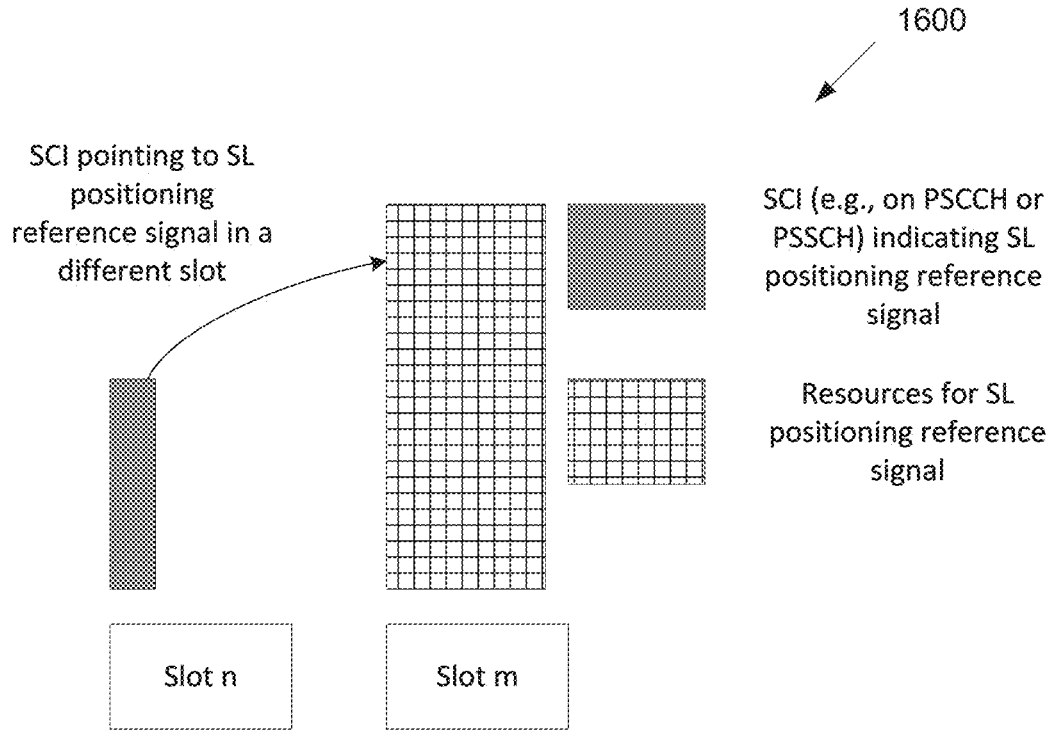
Figure 19:
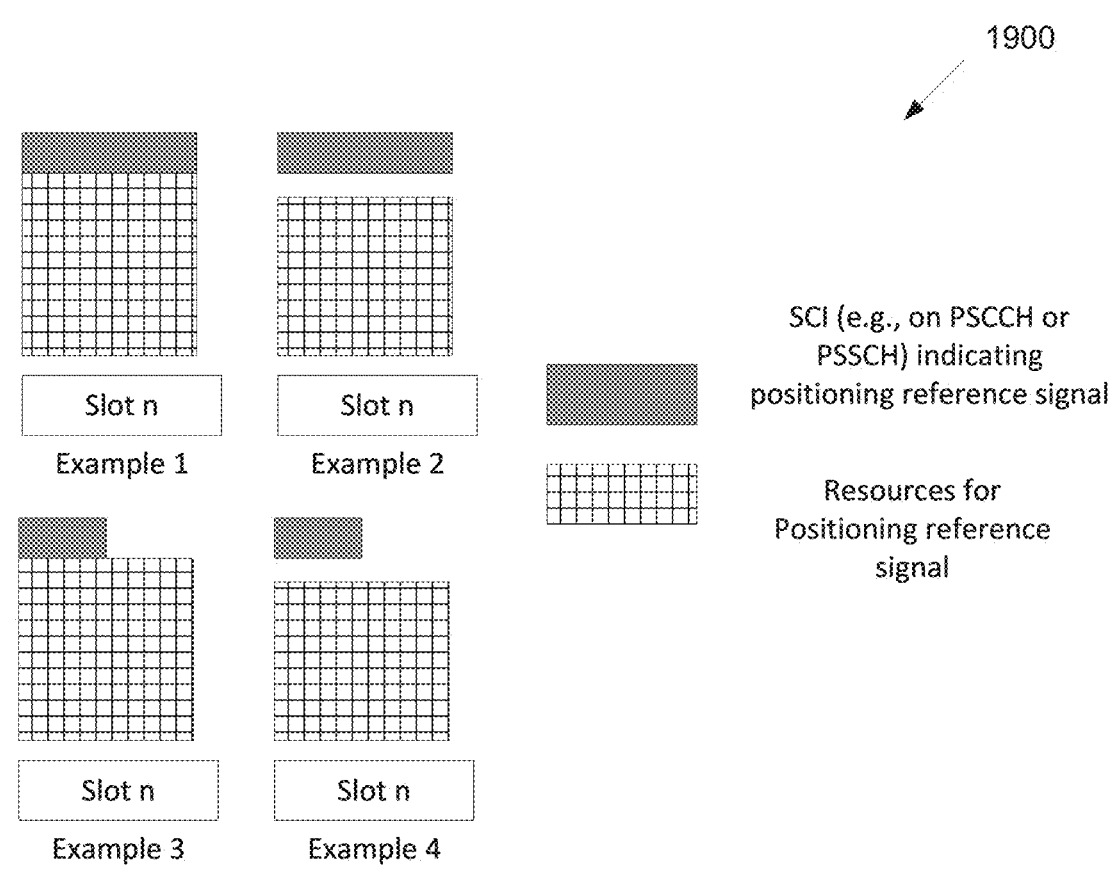
Figure 20:
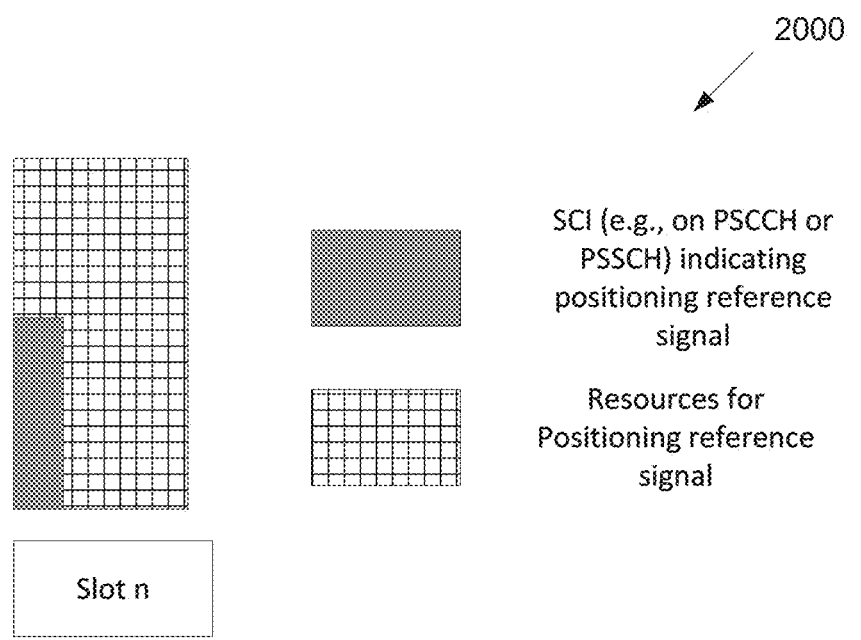
Figure 23:
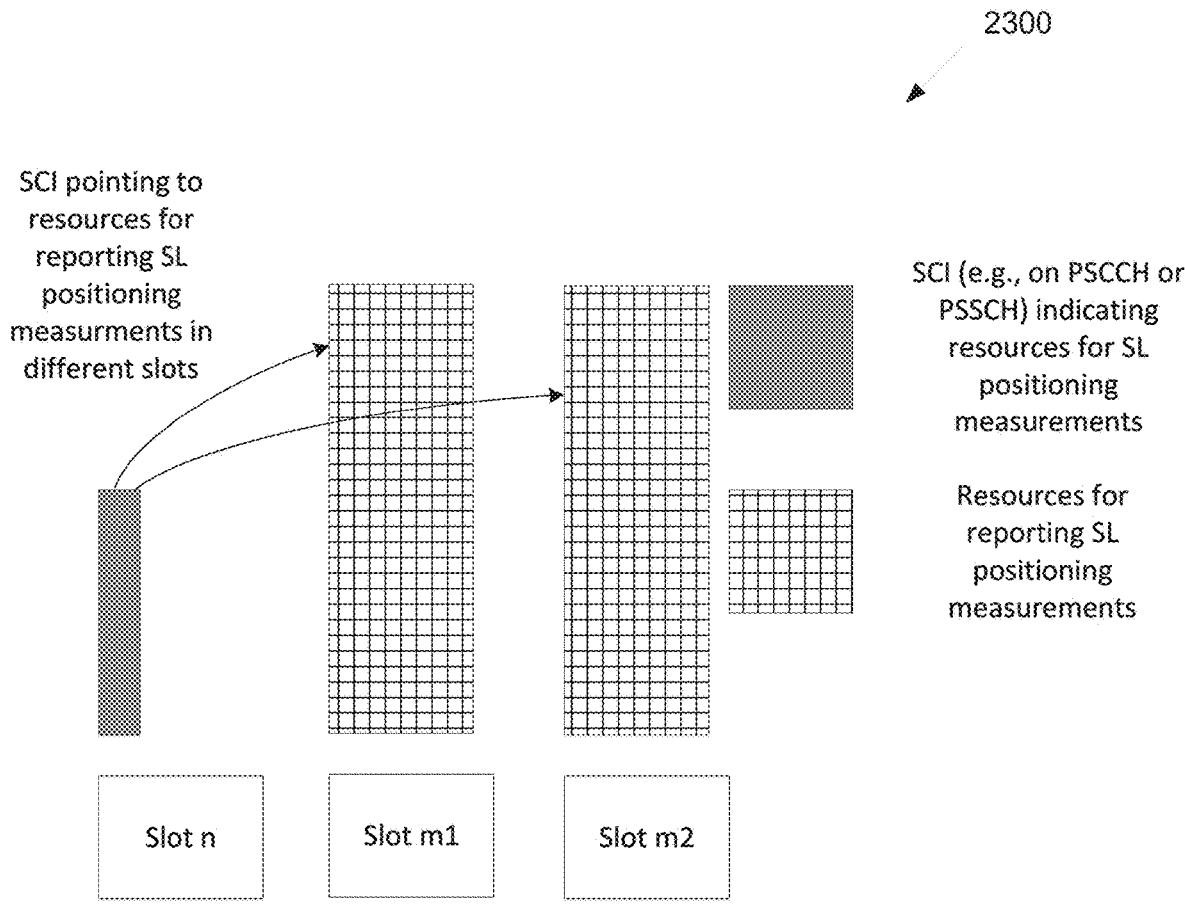

of positioning architecture according to embodiments of the present disclosure;

FIG. 7 illustrates an example of UE in coverage of a network according to embodiments of the present disclosure;

FIG. 8 illustrates a signaling flow of a method for SL positioning according to embodiments of the present disclosure;

FIG. 9 illustrates another signaling flow of a method for SL positioning according to embodiments of the present disclosure;

FIG. 10 illustrates yet another signaling flow of a method for SL positioning according to embodiments of the present disclosure;

FIG. 11 illustrates a flowchart of method for a UE according to embodiments of the present disclosure;

FIG. 12 illustrates another flowchart of method for a UE according to embodiments of the present disclosure;

FIG. 13 illustrates yet another flowchart of method for a UE according to embodiments of the present disclosure;

FIG. 14 illustrates yet another flowchart of method for a UE according to embodiments of the present disclosure;

FIG. 15 illustrates an example of resource allocation for SL positioning according to embodiments of the present disclosure;

FIG. 16 illustrates another example of resource allocation for SL positioning according to embodiments of the present disclosure;

FIG. 17 illustrates yet another example of resource allocation for SL positioning according to embodiments of the present disclosure;

FIG. 18 illustrates yet another example of resource allocation for SL positioning according to embodiments of the present disclosure;

FIG. 19 illustrates yet another example of resource allocation for SL positioning according to embodiments of the present disclosure;

FIG. 20 illustrates yet another example of resource allocation for SL positioning according to embodiments of the present disclosure;

FIG. 21 illustrates yet another example of resource allocation for SL positioning according to embodiments of the present disclosure;

FIG. 22 illustrates yet another example of resource allocation for SL positioning according to embodiments of the present disclosure; and FIG. 23 illustrates yet another example of resource allocation for SL positioning according to embodiments of the present disclosure.

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.7.0, "NR; Physical channels and modulation"; 3GPP TS 38.212 v16.7.0, "NR; Multiplexing and Channel coding"; 3GPP TS 38.213 v16.7.0, "NR; Physical Layer Procedures for Control"; 3GPP TS 38.214 v16.7.0, "NR; Physical Layer Procedures for Data"; 3GPP TS 38.215 v16.4.0, "NR; Physical Layer Measurements;" 3GPP TS 38.321 v16.6.0, "NR; Medium Access Control (MAC) protocol specification"; 3GPP TS 38.331 v16.6.0, "NR; Radio Resource Control (RRC) Protocol Specification;" and 3GPP TS 36.213 v16.7.0, "Evolved Universal Terrestrial Radio Access (E-UTRA); Physical layer procedures."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
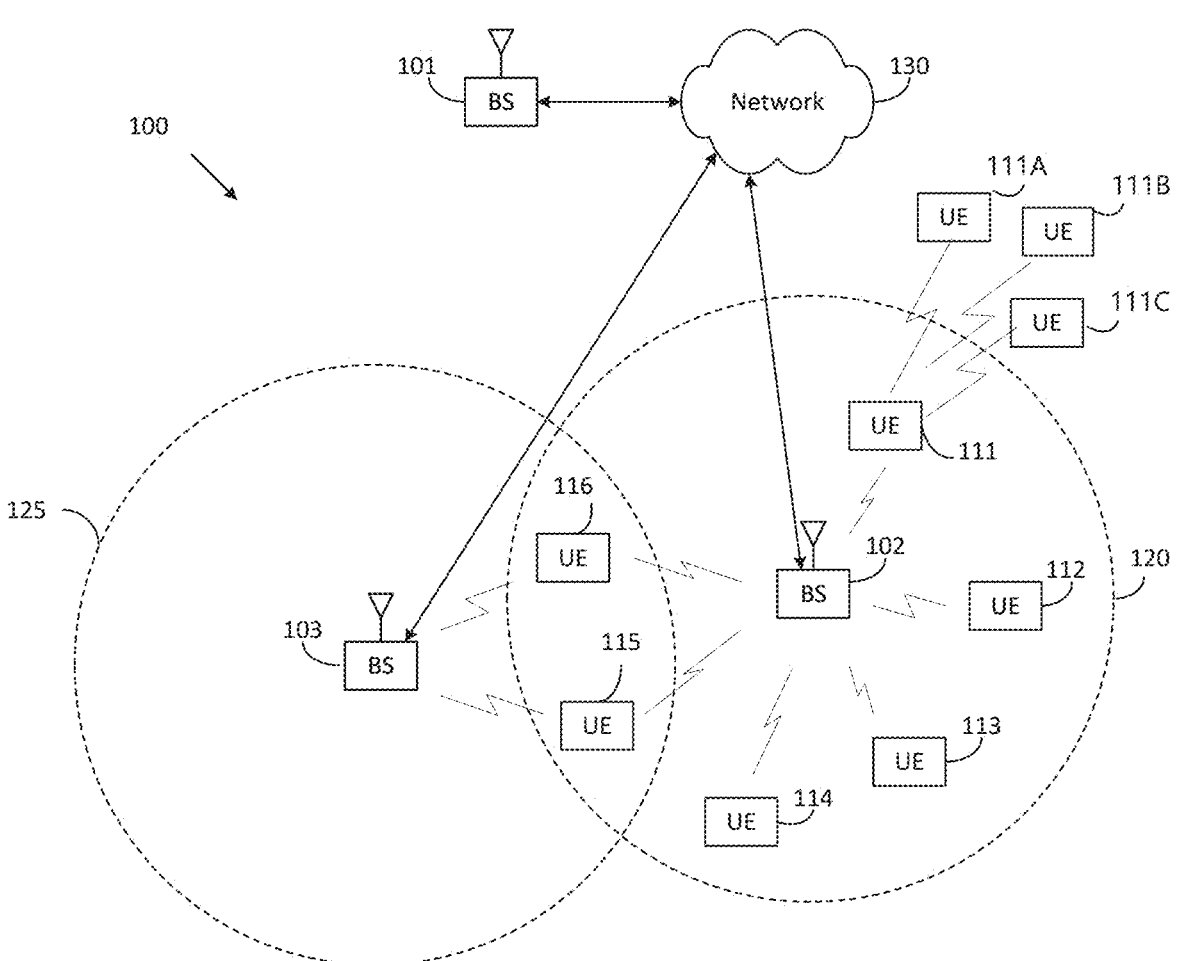
FIG. 1 illustrates an example of wireless network according to embodiments of the present disclosure.
Figure 2:
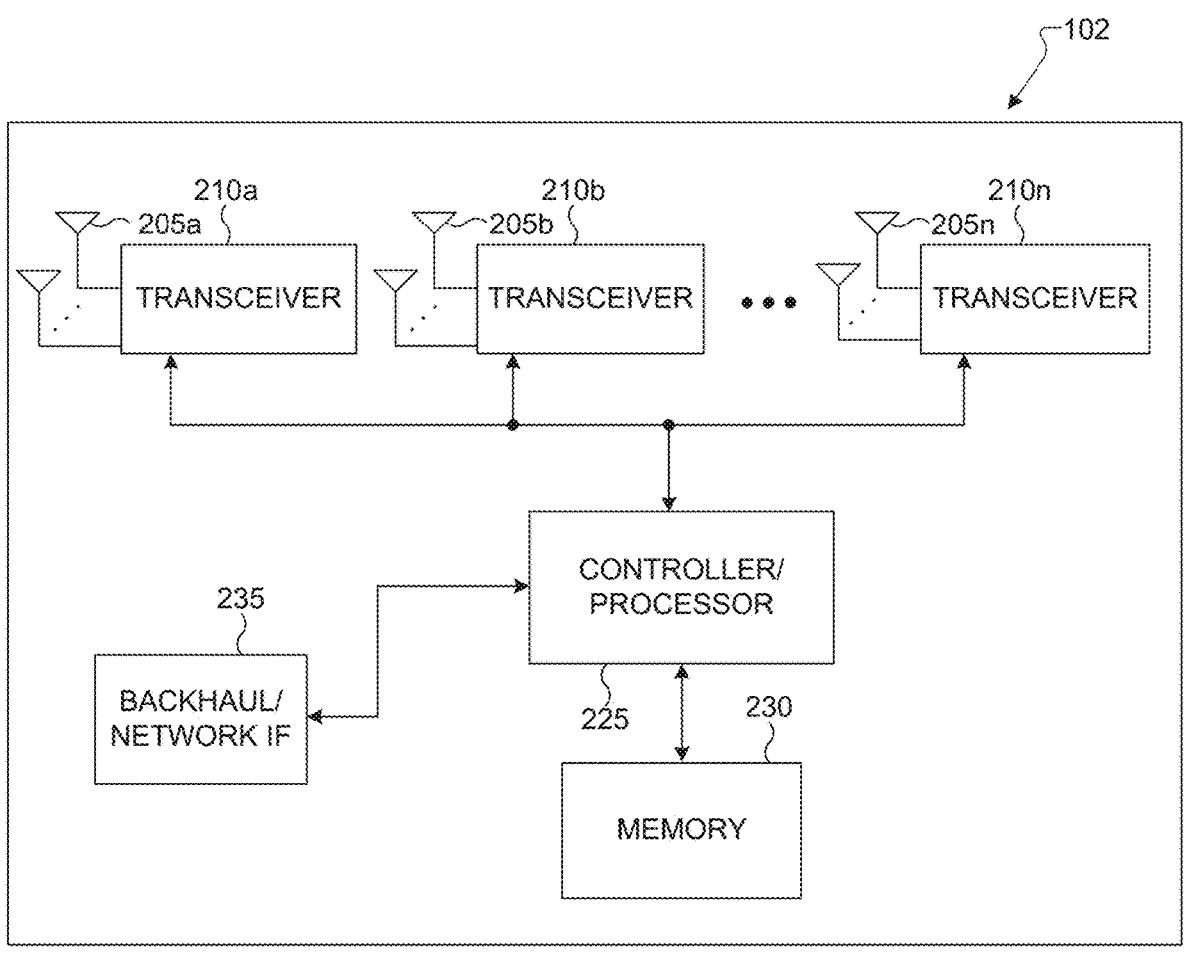
FIG. 2 illustrates an example of gNB according to embodiments of the present disclosure.
Figure 3:
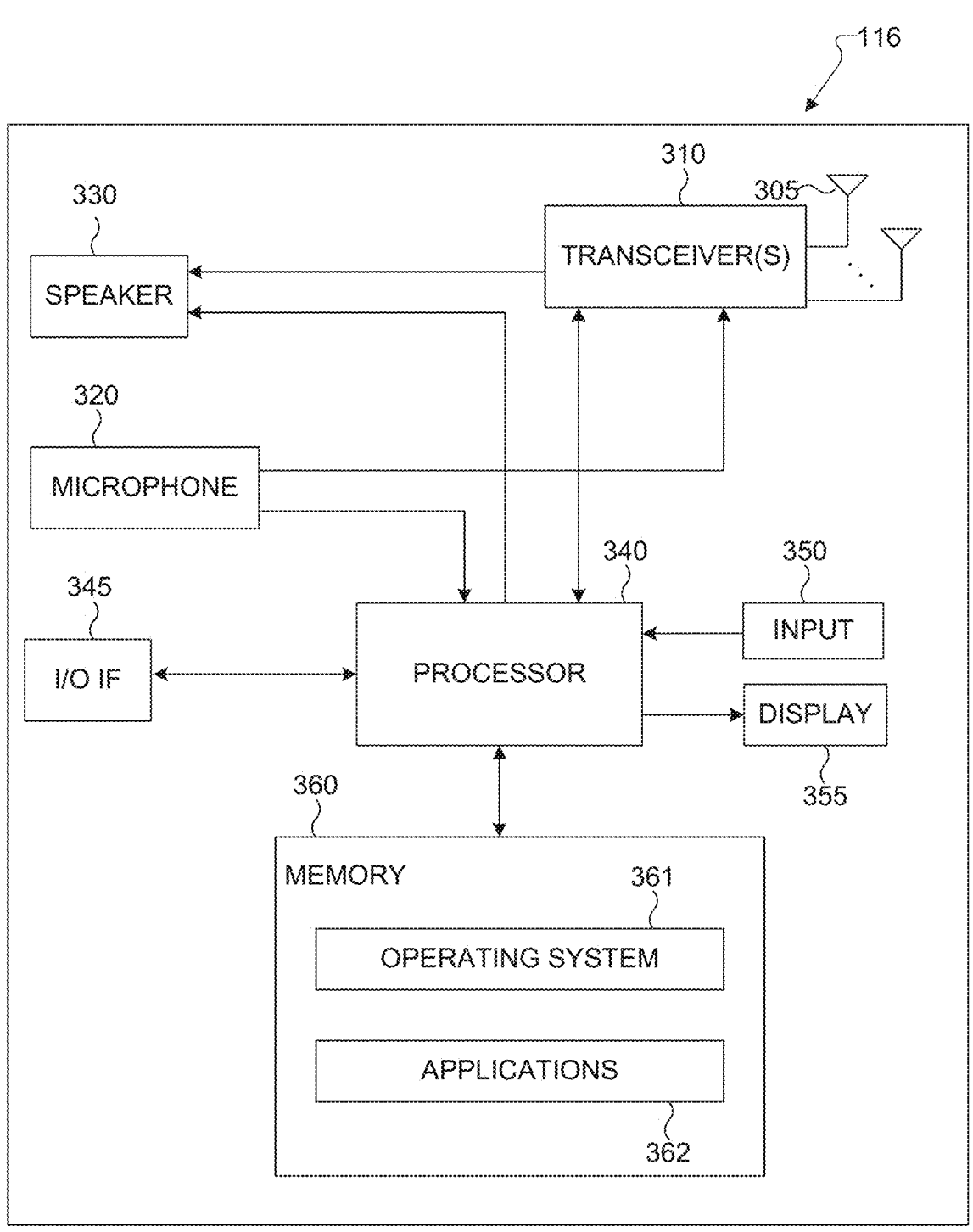
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an SL positioning within network coverage in a wireless communication system. In certain embodiments, and one or more of the gNBs 101-103 includes circuitry, programing, or a combination thereof, for an SL positioning within network coverage in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For in various embodiments, the controller/processor 225 could support SL positioning within network coverage in a wireless communication system, for example, by indicating, via a DL interface, configuration information for a SL PRS, determining resources for the SL PRS, and indicating, via the DL interface, DCI signaling including the resources for the SL PRS. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes an SL positioning within network coverage in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for an SL positioning within network coverage in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
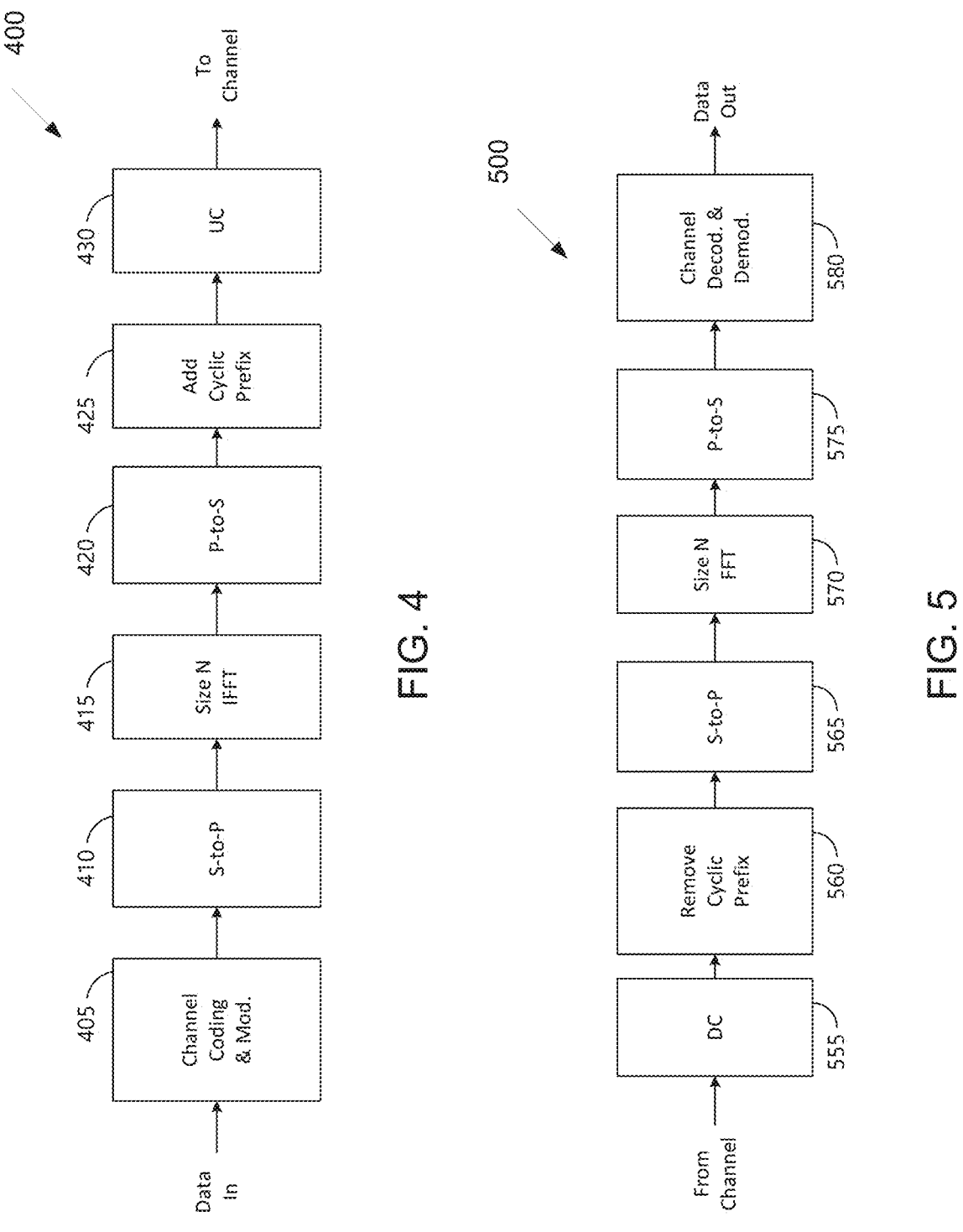
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications and SL positioning.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems (see also 3GPP standard specification). In addition, a slot can have symbols for SL communications. A UE can be configured one or more bandwidth parts (BWPs) of a system BW for transmissions or receptions of signals or channels.

NR supports positioning on the Uu interface. In the DL positioning reference signal (PRS) can be transmitted by a gNB to a UE to enable the UE to perform positioning measurements. In the UL a UE can transmit positioning sounding reference signal (SRS) to enable a gNB to perform positioning measurements. UE measurements for positioning include; DL PRS reference signal receive power (DL PRS RSRP), DL reference signal time difference (DL RSTD), UE Rx-Tx time difference, NR enhanced cell ID (E-CID) DL SSB radio resource management (RRM) measurement, and NR E-CID DL CSI-RS RRM measurement. NG-RAN measurements for positioning include; UL relative time of arrival (UL-RTOA), UL angle of arrival (UL AoA) and gNB Rx-Tx time difference. NR introduced several radio access technology (RAT) dependent positioning methods; time difference of arrival based methods such DL time difference of arrival (DL-TDOA) and UL time difference of arrival (UL TDOA), angle based methods such as UL angle of arrival (UL AoA) and DL angle of departure (DL AoD), multi-round trip time (RTT) based methods and E-CID based methods.

FIG. 6A illustrates an example of positioning architecture 600 according to embodiments of the present disclosure. An embodiment of the positioning architecture 600 shown in FIG. 6A is for illustration only.

Positioning schemes can be UE-based, i.e., the UE determines the location or UE-assisted (e.g., location management function (LMF) based), i.e., UE provides measurements for a network entity (e.g., LMF) to determine the location, or NG-RAN node assisted (i.e., NG-RAN node such as gNB provides measurement to LMF). LTE positioning protocol (LPP) as illustrated in 3GPP TS 37.355, first introduce for LTE and then extended to NR is used for communication between the UE and LMF. NR positioning protocol annex (NRPPa) as illustrated in 3GPP TS 38.455 is used for communication between the gNB and the LMF. FIG. 6A illustrates the overall positioning architecture along with positioning measurements and methods.

FIG. 6B illustrates an example LMF 650 according to embodiments of the present disclosure. The embodiment of the LMF 650 shown in FIG. 6B is for illustration only. However, LMFs come in a wide variety of configurations, and FIG. 6B does not limit the scope of this disclosure to any particular implementation of an LMF.

As shown in FIG. 6B, the LMF 650 includes a controller/processor 655, a memory 660, and a backhaul or network interface 665. The controller/processor 655 can include one or more processors or other processing devices that control the overall operation of the LMF 650. For example, the controller/processor can support functions related to positioning and location services. Any of a wide variety of other functions can be supported in the LMF 650 by the controller/processor 655. In some embodiments, the controller/processor 655 includes at least one microprocessor or microcontroller.

The controller/processor 655 is also capable of executing programs and other processes resident in the memory 660, such as a basic OS. In some embodiments, the controller/processor 655 supports communications between entities, such as gNB 102 and UE 116 and supports protocols such as LPP and NRPPA. The controller/processor 655 can move data into or out of the memory 660 as required by an executing process.

The controller/processor 655 is also coupled to the backhaul or network interface 665. The backhaul or network interface 665 allows the LMF 650 to communicate with other devices or systems over a backhaul connection or over a network. The interface 665 can support communications over any suitable wired or wireless connection(s). For example, when the LMF 650 is implemented as part of a cellular communication system or wired or wireless local area network (such as one supporting 5G, LTE, or LTE-A), the interface 665 can allow the LMF 650 to communicate with gNBs or eNBs or other network elements over a wired or wireless backhaul connection. The interface 665 includes any suitable structure supporting communications over a wired or wireless connection, such as an Ethernet or RF transceiver.

The memory 660 is coupled to the controller/processor 655. Part of the memory 660 can include a RAM, and another part of the memory 660 can include a Flash memory or other ROM. In certain embodiments, a plurality of instructions, such as a BIS algorithm is stored in memory 660. The plurality of instructions is configured to cause the controller/processor 655 to perform the BIS process and to perform positioning or location services algorithms.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH, and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE: (1) in HARQ-ACK reporting option 1, a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) in HARQ-ACK reporting option 2, a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option 1, when a UE that transmitted the PSSCH detects a NACK in a PSFCH reception, the UE can transmit another PSSCH with the TB (retransmission of the TB). In HARQ-ACK reporting option 2 when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\{t_0'^{SL}, t_1'^{SL}, t_2'^{SL}, \ldots, t_{T'_{MAX}-1}'^{SL}\}$$

and can be configured, for example, at least using a bitmap. Where, $T'_{MAX}$ is the number of SL slots in a resource pool in 1024 frames. Within each slot $$t_y'^{SL}$$

14 of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m\cdot n_{subCHsize}+j$, where j=0, 1, . . . , $n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window [n+T$_1$, n+T$_2$], such that a single-slot resource for transmission, R$_{x,y}$ is defined as a set of $L_{subCH}$ contiguous subchannels $$x + i, \text{where } i = 0, 1, \ldots, L_{subCH} - 1 \text{ in slot } t_y^{SL}.$$

T$_1$ is determined by the UE such that, $$0 \le T_1 \le T_{proc,1}^{SL}, \text{where } T_{proc,1}^{SL}$$

is a PSSCH processing time for example as defined in 3GPP standard specification (TS 38.214). T$_2$ is determined by the UE such that $T_{2min}\le T_2\le$Remaining Packet Delay Budget, as long as $T_{2min}<$Remaining Packet Delay Budget, else T$_2$ is equal to the Remaining Packet Delay Budget. T$_{2min}$ is a configured by higher layers and depends on the priority of the SL transmission.

The slots of a SL resource pool are determined as shown in TABLE 1.

TABLE 1

Determination of slots of a SL resource pool

1. Let set of slots that may belong to a resource be denoted by $\{t_0^{SL}, t_1^{SL}, t_2^{SL}, \ldots, t_{T_{MAX}-1}^{SL}\}$, where $0 \le t_i^{SL} < 10240 \times 2^\mu$, and $0 \le i < T_{max}$. $\mu$ is the sub-carrier spacing configuration. $\mu = 0$ for a 15 kHz sub-carrier spacing. $\mu = 1$ for a 30 kHz sub-carrier spacing. $\mu = 2$ for a 60 kHz sub-carrier spacing. $\mu = 3$ for a 120 kHz sub-carrier spacing. The slot index is relative to slot#0 of SFN#0 (system frame number 0) of the serving cell, or DFN#0 (direct frame number 0). The set of slots includes all slots except:
    a. $N_{S-SSB}$ slots that are configured for SL SS/PBCH Block (S-SSB).
    b. $N_{nonSL}$ slots where at least one SL symbol is not not-semi-statically configured as UL symbol by higher layer parameter tdd-UL-DL-ConfigurationCommon or sl-TDD-Configurauion. In a SL slot, OFDM symbols Y-th, (Y + 1)-th, . . . , (Y + X − 1)-th are SL symbols, where Y is determined by the higher layer parameter sl-StartSymbol and X is determined by higher layer parameter sl-LengthSymbols.
    c. $N_{reserved}$ reserved slots. Reserved slots are determined such that the slots in the set $\{t_0^{SL}, t_1^{SL}, t_2^{SL}, \ldots, t_{T_{MAX}-1}^{SL}\}$ is a multiple of the bitmap length (L$_{bitmap}$), where the bitmap (b$_0$, b$_1$, . . . , b$_{L_{bitmap}-1}$) is configured by higher layers. The reserved slots are determined as follows:
      i. Let $\{l_0, l_1, \ldots, l_{2^\mu \times 10240-N_{S-SSB}-N_{nonSL}-1}\}$ be the set of slots in range 0 . . . $2^\mu \times 10240 - 1$, excluding S-SSB slots and non-SL slots. The slots are arranged in ascending order of the slot index.
      ii. The number of reserved slots is given by: $N_{reserved} = (2^\mu \times 10240 - N_{S-SSB} - N_{nonSL})$ mod $L_{bitmap}$.
      iii. The reserved slot $l_r$ are given by: $r = \left\lfloor \dfrac{m \cdot (2^\mu \times 10240 - N_{S-SSB} - N_{nonSL})}{N_{reserved}} \right\rfloor$, TABLE 1-continued Determination of slots of a SL resource pool where, m = 0, 1, . . . , $N_{reserved} - 1$ $T_{max}$ is given by: $T_{max} = 2^{\mu} \times 10240 - N_{S-SSB} - N_{nonSL} - N_{reserved}$.

2. The slots are arranged in ascending order of slot index.

3. The set of slots belonging to the SL resource pool, $\{t_0'^{SL}, t_1'^{SL}, t_2'^{SL}, \ldots, t_{T'_{MAX}-1}'^{SL}\}$, are determined as follows:

a. Each resource pool has a corresponding bitmap $(b_0, b_1, \ldots, b_{L_{bitmap}-1})$ of length $L_{bitmap}$.

b. A slot $t_k^{SL}$ belongs to the SL resource pool if $b_{k \bmod L_{bitmap}} = 1$ c. The remaining slots are indexed successively staring from 0, 1, . . . $T'_{MAX} - 1$.
       Where, $T'_{MAX}$ is the number of remaining slots in the set.

Slots can be numbered (indexed) as physical slots or logical slots, wherein physical slots include all slots numbered sequential, while logical slots include only slots that can be allocated to sidelink resource pool as described above numbered sequentially. The conversion from a physical duration, $P_{rsvp}$, in milli-second to logical slots, $$P'_{rsvp},$$

is given by $$P'_{rsvp} = \left\lceil \frac{T'_{max}}{10240 \text{ ms}} \times P_{rsvp} \right\rceil$$

(see 3GPP standard TS 38.214).

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels $$x + i, \text{ where } i = 0, 1, \ldots, L_{subCH} - 1 \text{ in slot } t_y^{SL}.$$

$T_1$ is determined by the UE such that, $$0 \leq T_1 \leq T_{proc,1}^{SL} \text{ where } T_{proc,1}^{SL}$$

is a PSSCH processing time for example as defined in 3GPP standard specification TS 38.214. $T_2$ is determined by the UE such that $T_{2min} \leq T_2 \leq$ Remaining Packet Delay Budget, as long as $T_{2min} <$ Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure: (1) the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions; the identified candidate resources after resource exclusion are provided to higher layers and (2) the second step (e.g., preformed in the higher layers) is to select or re-select a resource from the identified candidate resources the identified candidate resources after resource exclusion are provided to higher layers.

During the first step of the resource (re-)selection procedure, a UE can monitor slots in a sensing window $[n-T_0, n-T_{proc,0})$, where the UE monitors slots belonging to a corresponding sidelink resource pool that are not used for the UE's own transmission. To determine a candidate single-slot resource set to report to higher layers, a UE excludes (e.g., resource exclusion) from the set of available single-slot resources for SL transmission within a resource pool and within a resource selection window, the following as shown in TABLE 2.

TABLE 2

Determination of a candidate single-slot resource set

1. Single slot resource $R_{x,y}$, such that for any slot $t_m'^{SL}$ not monitored within the sensing window with a hypothetical received SCI Format 1-0, with a "resource reservation period" set to any periodicity value allowed by a higher layer parameter reseverationPeriodAllowed, and indicating all sub-channels of the resource pool in this

TABLE 2-continued

Determination of a candidate single-slot resource set slot, satisfies condition 2.2. below.
2. Single slot resource $R_{x,y}$, such that for any received SCI within the sensing window:
    1. The associated L1-RSRP measurement is above a (pre-)configured SL-RSRP threshold, where the SL-RSRP threshold depends on the priority indicated in the received SCI and that of the SL transmission for which resources are being selected.

2. (Condition 2.2) The received SCI in slot $t'^{SL}_m$, or if "resource reservation field" is present in the received SCI the same SCI is assumed to be received in slot $$t'^{SL}_{m+q \times P'_{rsvp\_Rx}},$$ indicates a set of resource blocks that overlaps $R_{x,y+j \times P'_{rsvp\_Tx}}$.

Where,
      q = 1, 2, . . . , Q, where, $$\text{If } P_{rsvp\_RX} \leq T_{scal} \text{ and } n' - m < P'_{rsvp\_Rx} \rightarrow Q = \left\lceil \frac{T_{scal}}{P_{rsvp\_RX}} \right\rceil.$$

$T_{scal}$ is $T_2$ in units of milli-seconds.
      Else Q = 1

If n belongs to $\left( t'^{SL}_0, t'^{SL}_1, \ldots , t'^{SL}_{T'_{max}-1} \right)$, $n' = n$, else n' is the first slot after slot n belonging to set $\left( t'^{SL}_0, t'^{SL}_1, \ldots , t'^{SL}_{T'_{max}-1} \right)$.

j = 0, 1, . . . , $C_{resel} - 1$
      $P_{rsvp\_RX}$ is the indicated resource reservation period in the received SCI in physical slots, and $P'_{rsvp\_Rx}$ is that value converted to logical slots.

$P'_{rsvp\_Tx}$ is the resource reservation period of the SL transmissions for which resources are being reserved in logical slots.
3. If the candidate resources are less than a (pre-)configured percentage, such as 20%, of the total available resources within the resource selection window, the (pre-)configured SL-RSRP thresholds are increased by a predetermined amount, such as 3 dB.

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$. The re-evaluation check includes: (1) performing the first step of the SL resource selection procedure as illustrated in 3GPP TS 38.214, which involves identifying a candidate (available) sidelink resource set in a resource selection window as previously described; (2) If the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$.

When pre-emption check is enabled by higher layers, pre-emption check includes: (1) performing the first step of the SL resource selection procedure as illustrated in 3GPP TS 38.214, which involves identifying candidate (available) sidelink resource set in a resource selection window as previously described; (2) if the pre-selected and reserved resource is available in the candidate sidelink resource set, the resource is used/signaled for sidelink transmission; and (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority, else, the resource is used/signaled for sidelink transmission.

The positioning solutions provided for release 16 target the following commercial requirements for commercial applications as shown in TABLE 3.

TABLE 3

| Commercial requirements | |
| --- | --- |
| Requirement characteristic | Requirement target |
| Horizontal Positioning Error | Indoor: 3 m for 80% of the UEs |
| | Outdoor: 10 m for 80% of the UEs |
| Vertical Positioning Error | Indoor: 3 m for 80% of the UEs |
| | Outdoor: 3 m for 80% of the UEs |
| End to end latency | Less than 1 second |

To meet these requirements, radio access technology (RAT)-dependent, RAT independent, and a combination of RAT-dependent and RAT independent positioning schemes have been considered. For the RAT-dependent positioning schemes, timing based positioning schemes as well as angle-based positioning schemes have been considered. For timing based positioning schemes, NR supports DL Time Difference of Arrival (DL-TDOA), using positioning reference signals (PRS) for time of arrival measurements. NR also supports UL Time Difference of Arrival (UL-TDOA), using sounding reference signals (SRS) for time of arrival measurements.

NR also supports round-trip time (RTT) with one or more neighboring gNBs or transmission/reception points (TRPs). For angle based positioning schemes, NR exploits the beam-based air interface, supporting downlink angle of departure (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, terrestrial beacon system (TBS), as well as sensors within the UE such as accelerometers, gyroscopes, magnetometers, etc. Some of the UE sensors are also known as inertial measurement unit (IMU).

As NR expands into new verticals, there is a need to provide improved and enhanced location capabilities to meet various regulatory and commercial positioning requirements. 3GPP SA1 considered the service requirements for high accuracy positioning in 3GPP TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (see table in 3GPP TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIoT applications. Targeting to achieve sub-meter accuracy with a target latency less than 100 ms for commercial applications, and accuracy better than 20 cm with a target latency in the order of 10 ms for IIoT applications.

In Rel-17, RAN undertook a study item for in-coverage, partial coverage and out-of-coverage NR positioning use cases. The study focused on identifying positioning use cases and requirements for V2X and public safety as well as identifying potential deployment and operation scenarios. The outcome of the study item is included in TR 38.845. V2X positioning requirements depend on the service the UE operates, and are applicable to absolute and relative positioning.

Use cases include indoor, outdoor and tunnel areas, within network coverage or out of network coverage; as well as with GNSS-based positioning available, or not available, or not accurate enough; and with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range. The 5G system can also support determining the velocity of a UE with a speed accuracy better that 0.5 m/s and a 3-Dimension direction accuracy better than 5 degrees. Public safety positioning is to support indoor and outdoor use cases, with in network coverage or out of network coverage; as well as with GNSS-based positioning available, or not available or not accurate enough. Public safety positioning use cases target a 1-meter horizontal accuracy and a vertical accuracy of 2 m (absolute) or 0.3 m (relative).

In terms of deployment and operation scenarios for in-coverage, partial-coverage and out-of-coverage NR positioning use case, TR 38.845 has identified the following: (1) for network coverage: In-network coverage, partial network coverage as well as out-of-network coverage. In addition to scenarios with no GNSS and no network coverage; (2) radio link: Uu interface (UL/DL interface) based solutions, PC5 interface (SL interface) based solutions and their combinations (hybrid solutions). As well as RAT-independent solutions such as GNSS and sensors; (3) positioning calculation entity: Network-based positioning when the positioning estimation is performed by the network and UE-based positioning when the positioning estimation is performed by the UE; (4) a UE Type: For V2X UEs, this can be a UE installed in a vehicle, a roadside unit (RSU), or a vulnerable road user (VRU). Some UEs can have distributed antennas, e.g., multiple antenna patterns that can be leveraged for positioning. UEs can have different power supply limitations, for example VRUs or handheld UEs have limited energy supply compared to other UEs; and (5) Spectrum: This can include licensed spectrum and unlicensed spectrum for the Uu interface and the PC5 interface; as well as ITS-dedicated spectrum for the PC5 interface.

In the present disclosure, procedures and signaling are provided for the configuration of SL resources by the network for use for SL positioning reference signal and reporting SL positioning measurements. In some examples, the network configures resources to a first SL UE for use for SL positioning reference signal and/or for reporting SL position measurements. The first SL UE indicates SL resources to a second SL UE for SL positioning reference signal and/or for reporting SL position measurements. The first SL transmits the positioning reference signal to the second SL UE. The second SL UE performs SL positioning measurements and reports the SL positioning measurements on the indicated resources. In some examples, the network configures resources to a first SL UE for use for SL positioning reference signal. The first SL UE indicates SL resources to a second SL UE for SL positioning reference signal. The second SL transmits the positioning reference signal to a first SL UE. The first SL UE performs SL positioning measurements.

SL is one of the promising features of NR, targeting verticals such the automotive industry, public safety, industrial internet of things (IIoT) and other commercial application. 3GPP Rel-16 is the first NR release to include sidelink through work item "5G V2X with NR sidelink" with emphasis on V2X and public safety where the requirements are met. In Rel-17, the support of SL has been expanded to other types of UEs such a vulnerable road users (VRUs), pedestrian UEs (PUEs) and other types of handheld devices, by supporting mechanisms for power saving for SL resource allocation as well as mechanisms that enhance reliability and reduce latency of SL transmissions.

Another feature that NR supports is positioning, using the NR radio interface for performing positioning measurements to determine or assist in determining the location of a UE. NR positioning was first introduced using the Uu interface in Rel-16, through work item "NR positioning support." Rel-17 further enhanced accuracy and reduced the latency of NR-based positioning through work item "NR positioning enhancements." In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. In Rel-18 a new Study Item has been discussed to study and evaluate performance and feasibility of potential solutions for SL positioning.

In the present disclosure, methods and signaling are provided for a network configuration of SL resources to be used for SL positioning reference signal and reporting of SL positioning measurements. In the present disclosure, followings are provided: the network to (1) configure SL resources for the transmission of positioning reference signals on the SL interface (PC5 interface), (2) configuration of SL resources for reporting SL positioning measurements on the SL interface (PC5 interface). The network configures the SL resources to a first UE. In some examples, the first UE can indicate the SL resources to a second SL UE. In some examples, the first SL UE transmits the SL positioning reference signals on the corresponding resources configured by the network. In some examples, the second SL UE transmits the SL positioning reference signals on the corresponding resources indicated by the first SL UE. In some examples, the first SL UE transmits the SL positioning measurements on the corresponding resources configured by the network. In some examples, the second SL UE transmits the SL positioning measurements on the corresponding resources indicated by the first SL UE.

The present disclosure relates to a 5G/NR communication system. This disclosure provides signaling and methods for: (1) configuring resources for SL positioning reference signals on the SL interface (PC5 interface); (2) configuring resources for reporting SL positioning measurements on the SL interface (PC5 interface); and (3) configuring UEs to perform measurements on the SL interface using the positioning reference signals transmitted on the SL interface.

In the present disclosure, a SL positioning reference signal refers generically to a physical reference signal transmitted on the SL interface to assist in determining a position of a SL UE based on measurements performed on the SL positioning reference signal. In one example, a SL positioning reference signal can have a physical signal structure and/or resource allocation similar to the physical signal structure and/or resource allocation of a DL positioning reference signal (PRS) used in DL of the Uu interface in NR, except that the SL positioning reference signal is transmitted/received on the SL interface (PC5 interface).

In another example, a SL positioning reference signal can have a physical signal structure and/or resource allocation similar to the physical signal structure and/or resource allocation of a UL positioning sounding reference signal (SRS) used in UL of the Uu interface in NR, except that the SL positioning reference signal is transmitted/received on the SL interface (PC5 interface). In another example, a SL positioning reference signal can have a physical signal structure and/or resource allocation combining aspects of the physical signal structure and/or resource allocation of (1)

DL positioning reference signal (PRS) used in DL of the Uu interface in NR and (2) UL positioning sounding reference signal (SRS) used in UL of the Uu interface in NR, except that the SL positioning reference signal is transmitted/received on the SL interface (PC5 interface). In another example, a SL positioning reference signal can have a new physical signal structure and/or resource allocation for use on the SL interface (PC5 interface).

In one embodiment, the network can configure SL resources for SL positioning reference signal and/or SL resources for reporting SL measurements. The network can further configure SL UEs to perform SL positioning measurements.

A UE is in coverage of a network as shown in FIG. 7. The network can configure the UE with resources to use for: (1) SL positioning reference signals on the SL interface (PC5 interface); and (2) reporting of SL positioning measurements on the SL interface (PC5 interface).

SL Positioning reference signals are reference signals transmitted on the SL interface by a first UE. The SL positioning reference signals are received by one or more second UE(s), wherein the second UE(s) performs SL positioning measurements on the SL positioning reference signals. SL Positioning measurements are measurements that aid in finding the position of a SL UE, e.g., the absolute position of the first SL UE and/or the absolute position of the second SL UE, and/or the relative of position of the first SL UE to the second SL UE and/or the relative position of the second SL UE to the first SL UE. Absolute position is defined in a frame of reference, e.g., the Global frame of reference (e.g., using latitude and longitude and/or elevation).

SL positioning measurements can include: (1) SL reference signal time difference (RSTD). For example, the time difference between a positioning reference signal received by a SL UE and a reference time, in one example the reference time can be determined by positioning reference signal of another (e.g., reference UE); (2) SL reference signal receive power (RSRP) of a SL positioning reference signal; (3) SL angle of arrival (AoA) of a SL positioning reference signal; and (4) SL Rx-Tx time difference. For example, this can be the difference between the receive time of a first SL positioning reference signal and the transmit time of a second SL positioning reference signal.

FIG. 7 illustrates an example of UE in coverage of a network 700 according to embodiments of the present disclosure. An embodiment of the UE in coverage of a network 700 shown in FIG. 7 is for illustration only.

In one example, a gNB allocated resources to a first SL UE for SL positioning reference signals on the SL interface (PC5) interface.

In one example, the resources allocated to a first SL UE for SL positioning reference signals are for the first SL UE to transmit SL positioning reference signals to one or more second SL UEs. In one example, the first UE can signal the one or more second UEs the SL resources on which the first UE transmits the SL positioning reference signals.

In one example, the resources allocated to a first SL UE for SL positioning reference signals are for the first SL UE to receive SL positioning reference signals from one or more second SL UEs. In one example, the first UE can signal the one or more second UEs the SL resources on which the one or more second UE(s) can transmit the SL positioning reference signals to the first SLUE.

In one example, the resources allocated to a first SL UE for SL positioning reference signals are (1) for the first SL UE to transmit SL positioning reference signals to one or more second SL UEs and/or (2) for the first SL UE to receive SL positioning reference signals from one or more third SL UEs. In one example, the one or more second SL UE(s) are the same as the one or more third SL UE(s). In one example, the one or more second SL UE(s) are different from the one or more third SL UE(s). In one example, some of the one or more second SL UE(s) are the same as one or more third SL UE(s), and some of the one or more second SL UE(s) are different from one or more third SL UE(s). In one example, the first UE can signal the one or more second UEs the SL resources on which the first UE transmits the SL positioning reference signals.

In one example, the first UE can signal the one or more third UEs the SL resources on which the one or more third UE(s) can transmit the SL positioning reference signals to the first SL UE.

In one example, a gNB allocated resources to a first SL UE for reporting SL positioning measurements on the SL interface (PC5) interface.

In one example, the resources allocated to a first SL UE for reporting SL positioning measurements are for the first SL UE to receive SL positioning measurements from one or more second SL UE(s). In one example, the first UE can signal the one or more second SL UE(s) the SL resources on which the one or more second UE(s) can transmit the SL positioning measurements to the first SL UE, for example, the SL positioning measurements can be performed on SL positioning reference signal transmitted by the first SL UE and/or other SL UE(s).

In one example, the resources allocated to a first SL UE for reporting SL positioning measurements are for the first SL UE to transmit SL positioning measurements to one or more second SL UE(s). In one example, the first UE can signal the one or more second SL UE(s) the SL resources on which the first UE transmits the SL positioning measurements, for example the SL positioning measurements can be performed on SL positioning reference signal transmitted by a second SL UE and/or other SL UE(s).

In one example, the resources allocated to a first SL UE for reporting SL positioning measurements are (1) for the first SL UE to receive SL positioning measurements from one or more second SL UEs and/or (2) for the first SL UE to transmit SL positioning measurements to one or more third SL UEs. In one example, the one or more second SL UE(s) are the same as the one or more third SL UE(s). In one example, the one or more second SL UE(s) are different from the one or more third SL UE(s). In one example, some of the one or more second SL UE(s) are the same as one or more third SL UE(s), and some of the one or more second SL UE(s) are different from one or more third SL UE(s).

In one example, the first UE can signal the one or more second SL UE(s) the SL resources on which the one or more second UE(s) can transmit the SL positioning measurements to the first SL UE, for example, the SL positioning measurements can be performed on SL positioning reference signal transmitted by the first SL UE and/or other SL UE(s). In one example, the first UE can signal the one or more third SL UE(s) the SL resources on which the first UE transmits the SL positioning measurements, for example the SL positioning measurements can be performed on SL positioning reference signal transmitted by a third SL UE and/or other SL UE(s).

In one example, a gNB allocated resources to a first SL UE for SL positioning reference signals and for reporting SL positioning measurements on the SL interface (PC5) interface.

In one example, the gNB allocates to a first SL UE separate SL resources for (1) SL positioning reference signals and (2) reporting SL positioning measurements.

In one example, the gNB allocates to a first SL UE SL resources that can be used for (1) SL positioning reference signals and/or (2) reporting SL positioning measurements. It is up to the first SL UE to decide which SL resources are allocated to SL positioning reference signal and which resources are allocated to reporting SL positioning measurements.

In one example, the gNB allocates to a first SL UE SL resources that can be used for (1) SL positioning reference signals and/or (2) SL transmission from and/or SL reception to the first SL UE. It is up to the first SL UE to decide which SL resources allocated to SL transmission and/or SL reception are used for reporting SL positioning measurements.

In one example, the gNB allocates to a first SL UE SL resources that can be used for SL transmission from and/or SL reception to the first SL UE. It is up to the first SL UE to decide which SL resources allocated to SL transmission and/or SL reception are used for (1) SL positioning reference signals (2) reporting SL positioning measurements.

In one instance: (1) the SL resources used for SL positioning reference signals can follow disclosed example and sub-examples; and/or (2) the SL resources used for reporting SL positioning measurements can follow disclosed example and sub-examples.

FIG. 8 illustrates a signaling flow of a method 800 for SL positioning according to embodiments of the present disclosure. The method 800 as may be performed by a base station (e.g., 101-103 as illustrated in FIG. 1) and a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, in step 802, the gNB allocates SL resources to a first SL UE for (1) transmission of SL positioning reference signals on the SL interface, and/or (2) for reception SL positioning measurements on the SL interface. In step 804, the gNB sends the SL resource allocation message to the first SL UE.

In step 806, the first SL UE transmits SL positioning reference signals to one or more second SL UE(s) and/or (2) the first SL UE can indicate to the one or more second SL UE(s) SL resources on which the one or more second SL UEs transmit the SL positioning measurements. In step 808, the first SL UE transmits SL positioning RS/resource indication to the second one or more SL UE(s). The first UE is in network coverage. The second UE may be in network coverage or may be out of network coverage.

In step 810, the one or more second SL UE(s) perform SL positioning measurements. In step 812, the one or more second SL UE(s) report the SL positioning measurements and/or location information based on the SL positioning measurements to (1) a gNB, for example, when in coverage of the gNB, and/or (2) the first UE and/or other SL UE(s) (e.g., RSU, or group leader or platoon leader).

In step 814, the first SL UE can receive SL positioning measurements from the second SL UE, the first SL UE, if applicable can calculate location information. In step 816, the first SL UE reports the SL positioning measurements and/or location information based on the SL positioning measurements to (1) a gNB, and/or (2) another SL UE(s)

(e.g., RSU, or group leader or platoon leader). In step 818, the first SL UE transmits the SL positioning measurement message to the gNB.

FIG. 9 illustrates another signaling flow of a method 900 for SL positioning according to embodiments of the present disclosure. The method 900 as may be performed by a base station (e.g., 101-103 as illustrated in FIG. 1) and a UE (e.g., 111-116 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, in step 902, the gNB allocates SL resources to a first SL UE for (1) reception of SL positioning reference signals on the SL interface, and/or (2) for transmission SL positioning measurements on the SL interface. In step 904, the gNB transmits the SL resource allocation message to the first SL UE.

In step 906, the first SL UE indicates to one or more second SL UE(s) resources on which the one or more second SL UE(s) can transmit SL positioning reference signals. In step 908, the first SL UE transmits the resource indication to the second one or more SL UE(s). The first UE is in network coverage. The second UE may be in network coverage or may be out of network coverage.

In step 910 and 912, the one or more second SL UE(s) determine a transmission of SL positioning reference signal and transmit SL positioning reference signal.

In step 914, the first SL UE performs SL positioning measurements. In step 916, the first SL UL can report the SL positioning measurements and/or location information based on the SL positioning measurements to (1) a gNB, (2) a second SL UE and/or other SL UE(s) (e.g., RSU, or group leader or platoon leader). In step 918 and 920, the first SL UE transmits the SL position measurement report to the gNB and the second one or more SL UE(s).

FIG. 10 illustrates yet another signaling flow of a method 1000 for SL positioning according to embodiments of the present disclosure. The method 1000 as may be performed by a base station (e.g., 101-103 as illustrated in FIG. 1) and a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, in step 1002, the gNB allocates SL resources to a first SL UE for (1) transmission or reception of SL positioning reference signals on the SL interface, and/or (2) for transmission or reception of SL positioning measurements on the SL interface. In step 1004, the gNB transmits the SL resource allocation message to the first SL UE.

In step 1006, (1) the first SL UE transmits SL positioning reference signals to one or more second SL UE(s) and/or (2) the first SL UE can indicate to the one or more second SL UE(s) SL resources on which to transmit the SL positioning measurements and/or (3) the first SL UE indicates to one or more third SL UE(s) resources on which the one or more third SL UE(s) can transmit SL positioning reference signals. In one example, the one or more second SL UE(s) are the same as the one or more third SL UE(s). In one example, the one or more second SL UE(s) are different from the one or more third SL UE(s). In one example, some of the one or more second SL UE(s) are the same as one or more third SL UE(s), and some of the one or more second SL UE(s) are different from one or more third SL UE(s). In steps 1008 and 1010, the first SL UE transmits the SL positioning RS/resource indication to the second one or more SL UE(s) and the third one or more SL UE(s), respectively. The first UE is in network coverage. The second UE may be in network coverage or may be out of network coverage.

In step 1012, the third one or more SL UE(s) determines transmission of SL positioning reference signal. If the first UE indicates to one or more third SL UE(s) resources on which the one or more third SL UE(s) can transmit SL positioning reference signals, the one or more third UE(s) transmit SL positioning reference signal (e.g., step 1014).

In step 1018, the one or more second SL UE(s) perform SL positioning measurements and/or (2) the first SL UE performs SL positioning measurements. In step 1012, the one or more second SL UE(s) report the SL positioning measurements and/or location information based on the SL positioning measurements to a gNB, for example, when in coverage of the gNB, and/or the first UE and/or other SL UE(s) (e.g., RSU, or group leader or platoon leader); and/or the first SL UL can report the SL positioning measurements and/or location information based on the SL positioning measurements to a gNB, a second SL UE and/or other SL UE(s) (e.g., RSU, or group leader or platoon leader).

In step 1016, the first UE performs the SL positioning measurement. In step 1020, the first UE reports SL positioning measurements and/or location info to (1) gNB and/or SL UE. In step 1024, 1026, and 1028, the second one or more SL UE(s) transmits the SL positioning measurement report to the third one or more UE(S), the gNB, and the first one or more UE(s).

In one example, a gNB allocates resources to a UE for SL positioning reference signals on the SL interface (PC5 interface). The resources for SL positioning reference signals can be used for transmission and/or reception of SL positioning reference signals following examples and sub-examples.

In one example, the allocation of resources for SL positioning reference signals on the SL interface (PC5 interface) is using RRC signaling.

In another example, the allocation of resources for SL positioning reference signals on the SL interface (PC5 interface) is using MAC CE signaling.

In another example, the allocation of resources for SL positioning reference signals on the SL interface (PC5 interface) is using L1 control (e.g., DCI) signaling.

In one example, a new DCI Format (e.g., DCI Format 3_x) is designed for the allocation of resources for SL positioning reference signals on the SL interface (PC5 interface).

In another example, DCI Format 3_0 is extended or used for the allocation of resources for SL positioning reference signals on the SL interface (interface PC5).

In another example, the allocation of resources for SL positioning reference signals on the SL interface (PC5 interface) uses a combination of all or some of RRC signaling, MAC CE signaling and/or L1 control (e.g., DCI) signaling as described in examples of the present disclosure.

In one example, the resources allocated for SL positioning reference signals on the SL interface (PC5 interface) are allocated periodically.

In one example, the resources allocated for SL positioning reference signals on the SL interface (PC5 interface) are allocated semi-persistently. A first signal from the gNB configures the resources that can be used for SL positioning reference signals on the SL interface (PC5 interface). A second signal from the gNB activates the use of the resources for SL positioning reference signals. The first and second signals can be the same signal or in the same signal, e.g., the signal that configures the resources that can be used for SL positioning reference signals on the SL interface (PC5 interface) also activates these resources for use (transmission and/or reception). A third signal from the gNB deactivates the use of the resources for SL positioning reference signals.

In one example, the resources allocated for SL positioning reference signal on the SL interface (PC5 interface) are allocated aperiodically. A signal from the gNB to the UE can allocate 1 or N instances of resources for SL positioning reference signals. N can be specified in the system specification (in one example N is 2, in another example N is 3), pre-configured or configured/updated by RRC signaling and/or MAC CE signaling and/or L1 control (e.g., DCI) signaling. If not configured, a default value can be used for N.

In one example, a gNB allocates resources to a UE for reporting SL positioning measurements on the SL interface (PC5 interface). The resources for reporting SL positioning measurements can be used for transmission and/or reception of SL positioning measurements following examples and sub-examples.

In one example, the allocation of resources for reporting SL positioning measurements on the SL interface (PC5 interface) is using RRC signaling.

In another example, the allocation of resources for reporting SL positioning measurements on the SL interface (PC5 interface) is using MAC CE signaling.

In another example, the allocation of resources for reporting SL positioning measurements on the SL interface (PC5 interface) is using L1 control (e.g., DCI) signaling.

In one example, a new DCI Format (e.g., DCI Format 3_x) is designed for the allocation of resources for reporting SL positioning measurements on the SL interface (PC5 interface).

In another example, DCI Format 3_0 is extended or used for the allocation of resources for reporting SL positioning measurements on the SL interface (interface PC5).

In another example, the allocation of resources for reporting SL positioning measurements on the SL interface (PC5 interface) uses a combination of all or some of RRC signaling, MAC CE signaling and/or L1 control (e.g., DCI) signaling as described in examples disclosed in the present disclosure.

In one example, the resources allocated for reporting SL positioning measurements on the SL interface (PC5 interface) are allocated periodically.

In one example, the resources allocated for reporting SL positioning measurements on the SL interface (PC5 interface) are allocated semi-persistently. A first signal from the gNB configures the resources that can be used for reporting SL positioning measurements on the SL interface (PC5 interface). A second signal from the gNB activates the use of the resources for reporting SL positioning measurements. The first and second signals can be the same signal or in the same signal, e.g., the signal that configures the resources that can be used for reporting SL positioning measurements on the SL interface (PC5 interface) also activates these resources for use (transmission and/or reception). A third signal from the gNB deactivates the use of the resources for reporting SL positioning measurements.

In one example, the resources allocated for reporting SL positioning measurements on the SL interface (PC5 interface) are allocated aperiodically. A signal from the gNB to the UE can allocate 1 or N instances of resources for reporting SL positioning measurements. N can be specified in the system specification (in one example N is 2, in another example N is 3), pre-configured or configured/updated by RRC signaling and/or MAC CE signaling and/or L1 control (e.g., DCI) signaling. If not configured, a default value can be used for N.

In one example, a gNB allocates resources to a UE on the SL interface (PC5 interface), wherein the resources can be used at least for SL positioning reference signals and/or reporting SL positioning measurements on the SL interface. The resources for SL positioning reference signals can be used for transmission and/or reception of SL positioning reference signals following disclosed examples and sub-examples. The resources for reporting SL positioning measurements can be used for transmission and/or reception of SL positioning measurements following examples and sub-examples. The resources allocated to a UE on the SL interface can follow examples and sub-examples.

In one example, the allocation of resources to a UE on the SL interface (PC5 interface) is using RRC signaling.

In another example, the allocation of resources to a UE on the SL interface (PC5 interface) is using MAC CE signaling.

In another example, the allocation of resources to a UE on the SL interface (PC5 interface) is using L1 control (e.g., DCI) signaling.

In one example, a new DCI Format (e.g., DCI Format 3_x) is designed for the allocation of resources to a UE on the SL interface (PC5 interface).

In another example, DCI Format 3_0 is extended or used for the allocation of resources to a UE on the SL interface (interface PC5).

In another example, the allocation of resources to a UE on the SL interface (PC5 interface) uses a combination of all or some of RRC signaling, MAC CE signaling and/or L1 control (e.g., DCI) signaling as described in examples in the present disclosure.

In one example, the resources allocated to a UE on the SL interface (PC5 interface) are allocated periodically.

In one example, the resources allocated to a UE on the SL interface (PC5 interface) are allocated semi-persistently. A first signal from the gNB configures the resources allocated to a UE on the SL interface (PC5 interface). A second signal from the gNB activates the use of the resources allocated to a UE. The first and second signals can be the same signal or in the same signal, e.g., the signal that configures the allocation of resources to a UE on the SL interface (PC5 interface) also activates these resources for use (transmission and/or reception). A third signal from the gNB deactivates the use of the resources allocated to a UE.

In one example, the resources allocated to a UE on the SL interface (PC5 interface) are allocated aperiodically. A signal from the gNB to the UE can allocate 1 or N instances of resources to a UE. N can be specified in the system specification (in one example N is 2, in another example N is 3), pre-configured or configured/updated by RRC signaling and/or MAC CE signaling and/or L1 control (e.g., DCI) signaling. If not configured, a default value is used for N.

In one example, a UE can receive an indication of SL UEs (e.g., SL UEs in the surrounding or vicinity of the UE) that can receive SL positioning reference signals on the SL interface (PC5 interface) and perform SL positioning measurements (e.g., UEs that perform or support SL positioning).

In one example, this indication can be received through PC5 RRC signaling from a UE capable of receiving SL positioning reference signals on the SL interface (PC5 interface) and SL performing positioning measurements.

In another example, this indication can be received through PC5 MAC CE signaling from a UE capable of receiving SL positioning reference signals on the SL interface (PC5 interface) and performing SL positioning measurements.

In another example, this indication can be received through L1 control (e.g., SCI) signaling from a UE capable of receiving SL positioning reference signals on the SL interface (PC5 interface) and performing SL positioning measurements: (1) for example, this can be received in the first stage SCI, e.g., by using one of the reserved bits; (2) in another example, this can be received in the second stage SCI by including a bit that indicates the capability of a UE to receive and measure SL positioning reference signals.

In another example, this indication can be received from a UE capable of receiving SL positioning reference signals on the SL interface (PC5 interface) and performing SL positioning measurements, through a combination of all or some of RRC signaling, MAC CE signaling and/or L1 control (e.g., SCI) signaling as described in examples in the present disclosure.

In another example, this indication can be received through PC5 RRC signaling from a third UE, e.g., a group leader UE, a platoon leader UE, a RSU (infra-structure) UE.

In another example, this indication can be received through MAC CE signaling from a third UE, e.g., a group leader UE, a platoon leader UE, a RSU (infra-structure) UE.

In another example, this indication can be received through L1 control (e.g., SCI signaling from a third UE, e.g., a group leader UE, a platoon leader UE, a RSU (infra-structure) UE.

In another example, this indication can be received, from a third UE, through a combination of all or some of RRC signaling, MAC CE signaling and/or L1 control (e.g., SCI) signaling as described in examples in the present disclosure.

In another example, this indication can be received through RRC signaling from a gNB.

In another example, this indication can be received through MAC CE signaling from a gNB.

In another example, this indication can be received through L1 control (e.g., downlink control Information (DCI)) signaling from a gNB.

In another example, this indication can be received, from a gNB, through a combination of all or some of RRC signaling, MAC CE signaling and/or L1 control (e.g., DCI) signaling as described in examples in the present disclosure.

In another example, this indication can be received from a combination of all or some of (1) a UE capable of receiving SL positioning reference signals on the SL interface (PC5 interface) and performing SL positioning measurements, (2) a third UE, and/or (3) a gNB as described in examples in the present disclosure.

FIG. 11 illustrates a flowchart of method 1100 for a UE according to embodiments of the present disclosure. The method 1100 as may be performed by a UE (e.g., 111-116 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11 for a first UE and in FIG. 12 for a second UE, a gNB allocates resources to the first SL UE for SL positioning reference signals and/or reporting SL positioning measurements on the SL interface (PC5 interface). The first SL UE receives an indication of second SL UE(s) (e.g., the second SL UE(s) are in the surrounding or vicinity of the first UE) that can receive SL positioning reference signals on the SL interface (PC5 interface) and perform SL positioning measurements. In one sub-example, the network and/or another SL UE (e.g., RSU, or group leader or platoon leader) can configure a SL UE capable of supporting SL positioning to enable SL positioning measurements. The first UE selects a second SL UE (from the second UEs) to transmit the positioning reference signal to and/or to transmit an indication of SL resources on which the second UE can report SL positioning measurements.

The first SL UE transmits an indication of resources, to the second SL UE, which can be used for (1) SL positioning reference signals, and/or (2) reporting SL positioning measurements. The second SL UE receives an indication of resources, from the first SL UE, which can be used for (1) SL positioning reference signals, and/or (2) reporting SL positioning measurements. The first SL UE transmits the positioning reference signal on the allocated resources by the gNB to the second UE. The second SL UE performs SL positioning measurements, if applicable, the second UE can determine the location information (absolute location (position) and/or relative location) of the first and/or second UE based on the SL positioning measurements. The first UE is in network coverage. The second UE may be in network coverage or may be out of network coverage.

The second SL UE can report the SL positioning measurements and/or location information on the allocated resources for reporting SL positioning measurements to (1) the UE transmitting the SL positioning reference signal, (2) the UE providing an indication of the resources for reporting the SL position measurements, wherein this UE can be the same as the UE transmitting the SL positioning reference signal or a different SL UE, (3) a third UE (e.g., RSU, or group leader or platoon leader). The second SL UE can report the SL positioning measurements and/or location information to the network (e.g., when in network coverage). The first UE, if applicable, can receive the SL positioning measurements and/or location information on the indicated resources. The first UE can determine location information (absolute location (position) and/or relative location) based on the received SL positioning measurements.

The first SL UE can report the SL positioning measurements and/or location information to (1) the network, and/or (2) another SL UE (e.g., RSU, or group leader or platoon leader). Reporting position measurements and/or location information to the network can include; reporting to a gNB for which a UE has coverage and/or reporting to the LMF.

FIG. 12 illustrates another flowchart of method 1200 for a UE according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 11, in step 1102, the UE performs a reception of allocation of resources for transmission of SL positioning reference signal and/or reporting SL positioning measurements from a gNB. In step 1104, the UE performs a reception of indication of second UEs that can receive and measure SL positioning reference signals. In step 1106, the UE performs a selection of a second SL UE to transmit SL positioning reference signal to and/or to indicate SL resources for reporting SL positioning measurements to. In step 1108, the UE performs a transmission of indication of resources used for (1) SL positioning reference signal, and/or (2) reporting SL positioning measurements. In step 1110, the UE performs, if applicable, transmission of positioning reference signal to second UE on allocated resources. In step 1112, the UE performs, if applicable, a reception of SL positioning measurements from second UE on indicated resources. In step 1114, the UE performs a reporting of SL measurements and/or location information to (1) the network and/or (2) a SL UE.

As illustrated in FIG. 12, the UE in step 1202, performs a reception of indication of resources used for (1) SL positioning reference signals, and/or (2) reporting SL positioning measurements. In step 1204, the UE receives and measures SL positioning reference signal, and if applicable determine location information. In step 1206, the UE performs a reporting of SL measurements and/or location information to (1) a SL UE and/or (2) the network (e.g., when in coverage).

In one example, a UE can receive an indication of SL UEs (e.g., SL UEs in the surrounding or vicinity of the UE) that can transmit SL positioning reference signals on the SL interface (PC5 interface).

In one example, this indication can be received through PC5 RRC signaling from a UE capable of transmitting SL positioning reference signals on the SL interface (PC5 interface).

In another example, this indication can be received through PC5 MAC CE signaling from a UE capable of transmitting SL positioning reference signals on the SL interface (PC5 interface).

In another example, this indication can be received through L1 control (e.g., SCI) signaling from a UE capable of transmitting SL positioning reference signals on the SL interface (PC5 interface): (1) for example, this can be received in the first stage SCI, e.g., by using one of the reserved bits; and (2) in another example, this can be received in the second stage SCI by including a bit that indicates the capability of a UE to transmit SL positioning reference signals.

In another example, this indication can be received from a UE capable of transmitting positioning reference signals on the SL interface (PC5 interface), through a combination of all or some of RRC signaling, MAC CE signaling and/or L1 control (e.g., SCI) signaling as described in examples in the present disclosure.

In another example, this indication can be received through PC5 RRC signaling from a third UE, e.g., a group leader UE, a platoon leader UE, a RSU (infra-structure) UE.

In another example, this indication can be received through MAC CE signaling from a third UE, e.g., a group leader UE, a platoon leader UE, a RSU (infra-structure) UE.

In another example, this indication can be received through L1 control (e.g., SCI) signaling from a third UE, e.g., a group leader UE, a platoon leader UE, a RSU (infra-structure) UE.

In another example, this indication can be received, from a third UE, through a combination of all or some of RRC signaling, MAC CE signaling and/or L1 control (e.g., SCI) signaling as described in examples in the present disclosure.

In another example, this indication can be received through RRC signaling from a gNB.

In another example, this indication can be received through MAC CE signaling from a gNB.

In another example, this indication can be received through L1 control (e.g., DCI) signaling from a gNB.

In another example, this indication can be received, from a gNB, through a combination of all or some of RRC signaling, MAC CE signaling and/or L1 control (e.g., DCI) signaling as described in examples in the present disclosure.

In another example, this indication can be received from a combination of all or some of (1) a UE capable of transmitting positioning reference signals on the SL interface (PC5 interface), (2) a third UE, and/or (3) a gNB as described in examples in the present disclosure.

FIG. 13 illustrates yet another flowchart of method 1300 for a UE according to embodiments of the present disclosure. The method 1300 as may be performed by a UE (e.g., 111-116 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

In one example, as illustrated in FIG. 13 for a first UE and in FIG. 14 for a second UE, a gNB allocates resources to the first SL UE for SL positioning reference signals and/or reporting SL positioning measurements on the SL interface (PC5 interface). The first SL UE receives an indication of second SL UE(s) (e.g., the second SL UE(s) are in the surrounding or vicinity of the first UE) that can transmit SL positioning reference signals on the SL interface (PC5 interface). In one sub-example, the network and/or another SL UE (e.g., RSU, or group leader or platoon leader) can configure a SL UE capable of supporting SL positioning to enable transmission of SL positioning reference signals.

The first UE selects a second SL UE (from the second UEs) to receive the SL positioning reference signal from. The first SL UE transmits an indication, to the first SL UE of resources that can be used for SL positioning reference signals. The second SL UE receives an indication, from the first SL UE of resources that can be used for SL positioning reference signals. The second SL UE transmits the positioning reference signal on the resources indicated by the first SL UE. The first SL UE performs SL positioning measurements, if applicable, the first SL UE can determine the location information (absolute location (position) and/or relative location) of the first and/or second UE based on the SL positioning measurements. The first UE is in network coverage. The second UE may be in network coverage or may be out of network coverage.

The first SL UE can report the SL positioning measurements and/or location information on the allocated resources for reporting SL positioning measurements to (1) the UE transmitting the SL positioning reference signal, (2) a third UE (e.g., RSU, or group leader or platoon leader). The first SL UE can report the SL positioning measurements and/or location information to the network. The second SL UE, if applicable, can receive the SL positioning measurements and/or location information for the first SL UE. The second SL UE can determine location information (absolute location (position) and/or relative location) based on the received SL positioning measurements.

The second SL UE can report the SL positioning measurements and/or location information to (1) the network (e.g., if in network coverage), and/or (2) another SL UE, when reporting SL positioning measurements and/or location information to another UE, the second SL UE can receive from the first SL UE indication of SL resources to use for reporting SL positioning measurements. Reporting position measurements and/or location information to the network can include; reporting to a gNB for which a UE has coverage and/or reporting to the LMF.

FIG. 14 illustrates yet another flowchart of method 1400 for a UE according to embodiments of the present disclosure. The method 1400 as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 13, in step 1302, the UE performs a reception of allocation of resources for reception of SL positioning reference signal and/or reporting SL positioning measurements from a gNB. In step 1304, the UE performs a reception of indication of second UEs that can transmit SL positioning reference signals. In step 1306, the UE performs a selection of a second SL UE to receive SL positioning reference signal from. In step 1308, the UE performs a transmission of indication of resources for used SL positioning reference signal. In step 1310, the performs a reception of SL positioning reference signal on indicated resources, and performing SL positioning measurement. In step 1312, the UE performs a reporting of SL measurements and/or location information to (1) the network and/or (2) a SL UE.

As illustrated in FIG. 14, the UE performs, in step 1402, a reception of indication of resources used for transmission of SL positioning reference signals. In step 1404, the UE transmits SL positioning reference signal on indicated resources. In step 1406, the UE receives, if applicable, SL position measurements and/or location information. In step 1408, the UE performs, if applicable, a reporting of SL measurements and/or location information to (1) a SL UE and/or (2) the network (e.g., if in coverage).

In one example, the SL positioning reference signal is transmitted or received in the same resource pool as the SL data.

In another example, the SL positioning reference signal is transmitted or received in a resource pool configured for the transmission or reception of SL positioning reference signals.

In one example, the RRC signaling and/or MAC CE signaling and/or L1 control signaling (e.g., SCI) informing a SL UE receiving or transmitting the SL positioning reference signal about the SL positioning reference signal configuration is transmitted or received in the same resource pool as the SL positioning reference signal.

In another example, the RRC signaling and/or MAC CE signaling and/or L1 control signaling (e.g., SCI) informing a SL UE receiving or transmitting the SL positioning reference signal about the SL positioning reference signal configuration is transmitted or received in a resource pool different from the resource pool in which the SL positioning reference signal is transmitted or received.

In one example, one or more instances of a resource for SL positioning reference signal is associated with SL control information (SCI) that informs the second UE about resource(s) of SL positioning reference signal and corresponding configuration parameters.

FIG. 15 illustrates an example of resource allocation for SL positioning reference signal 1500 according to embodiments of the present disclosure. An embodiment of the resource allocation for SL positioning 1500 shown in FIG. 15 is for illustration only.

In one example, the SCI is transmitted e.g., on PSCCH and/or PSSCH in the same slot as the SL positioning reference signal. This is illustrated by way of example in FIG. 15.

FIG. 16 illustrates another example of resource allocation for SL positioning reference signal 1600 according to embodiments of the present disclosure. An embodiment of the resource allocation for SL positioning reference signal 1600 shown in FIG. 16 is for illustration only.

In another example, the SCI is transmitted e.g., on PSCCH and/or PSSCH in a slot different from the slot the SL positioning reference signal is transmitted in. This is illustrated by way of example in FIG. 16.

FIG. 17 illustrates yet another example of resource allocation for SL positioning reference signal 1700 according to embodiments of the present disclosure. An embodiment of the resource allocation for SL positioning reference signal 1700 shown in FIG. 17 is for illustration only.

In another example, the SCI is transmitted e.g., on PSCCH and/or PSSCH in a slot different from the slots the SL positioning reference signal is transmitted in. There are multiple (N) instances of the SL positioning reference signal indicated in the SCI. In one example, N is indicated in the SCI. In another example, N can be specified in the system specification, pre-configured or configured/updated by RRC signaling and/or MAC CE signaling and/or L1 control signaling. If not configured, a default value is used for N. This is illustrated by way of example in FIG. 17.

In one example, the SCI is transmitted by a first SL UE (that indicates resources for SL positioning reference signal) and the SL positioning reference signal is transmitted by the first SL UE.

In another example, the SCI is transmitted by a first SL UE (that indicates resources for SL positioning reference signal) and the SL positioning reference signal is transmitted by a second SL UE. To maintain causality in this example, the symbols/slots allocated to the SL positioning reference signal occur after the symbols/slots used for the corresponding SCI. There can additionally be a time gap between the SCI and the corresponding SL positioning reference signal (e.g., to account for propagation delay and processing time and Rx/Tx switching time at the second UE). In one example, the time gap can depend on a UE capability. In one example, the minimum time gap can depend on the sub-carrier spacing used for SL transmissions and receptions. In one example, the time gap can be pre-configured or configured/update by RRC signaling and/or MAC CE signaling and/or L1 control signaling.

In one example, when the SCI and the corresponding SL positioning reference signal are transmitted in the same slot, the slot structure can be according to one of the following examples.

FIG. 18 illustrates yet another example of resource allocation for SL positioning reference signal 1800 according to embodiments of the present disclosure. An embodiment of the resource allocation for SL positioning reference signal 1800 shown in FIG. 18 is for illustration only.

In one example, the resources used for the SCI and the corresponding SL positioning reference signal are time division multiplexed as shown in Examples 1, 2, 3, and 4 of FIG. 18.

In Example 1 of FIG. 18, the same frequency allocation is used for SCI and SL positioning reference signals. There is no time gap between the SL symbols used for SCI and the SL symbols used for SL positioning reference signal. In one example, there is an AGC symbol before the first symbol of the SCI. In one example, there is no AGC symbol before the first symbol of the SCI. In one example, the first symbol of the SL positioning reference signal is an AGC symbol. In one example, there is no AGC symbol for the SL positioning reference signal. An AGC symbol is a duplicate symbol of the following symbol.

In Example 2 of FIG. 18, the same frequency allocation is used for SCI and SL positioning reference signals. There is a time gap between the SL symbols used for SCI and the SL symbols used for SL positioning reference signal. In one example, there is an AGC symbol before the first symbol of the SCI. In one example, there is no AGC symbol before the first symbol of the SCI. In one example, the first symbol of the SL positioning reference signal is an AGC symbol. In one example, there is no AGC symbol for the SL positioning reference signal. An AGC symbol is a duplicate symbol of the following symbol. In one example, the time gap can depend on a UE capability. In one example, the time gap can depend on the sub-carrier spacing used for SL transmissions and receptions. In one example, the time gap can be pre-configured or configured/update by RRC signaling and/or MAC CE signaling and/or L1 control signaling.

In Example 3 of FIG. 18, a different frequency allocation is used for SCI and SL positioning reference signals. In one sub-example (shown in FIG. 18 example 3), the SCI and SL positioning reference signal start at the same frequency. In one sub-example, the SCI and SL positioning reference signal end at the same frequency. In a one sub-example, the SCI and SL positioning reference signal neither start nor end at the same frequency. There is no time gap between the SL symbols used for SCI and the SL symbols used for SL positioning reference signal. In one example, there is an AGC symbol before the first symbol of the SCI. In one example, there is no AGC symbol before the first symbol of the SCI. In one example, the first symbol of the SL positioning reference signal is an AGC symbol. In one example, there is no AGC symbol for the SL positioning reference signal. An AGC symbol is a duplicate symbol of the following symbol.

In Example 4 of FIG. 18, a different frequency allocation is used for SCI and SL positioning reference signals. In one sub-example (shown in FIG. 18 Example 4), the SCI and SL positioning reference signal start at the same frequency. In one sub-example, the SCI and SL positioning reference signal end at the same frequency. In a one sub-example, the SCI and SL positioning reference signal neither start nor end at the same frequency. There is a time gap between the SL symbols used for SCI and the SL symbols used for SL positioning reference signal. In one example, there is an AGC symbol before the first symbol of the SCI. In one example, there is no AGC symbol before the first symbol of the SCI. In one example, the first symbol of the SL positioning reference signal is an AGC symbol. In one example, there is no AGC symbol for the SL positioning reference signal. An AGC symbol is a duplicate symbol of the following symbol. In one example, the time gap can depend on a UE capability. In one example, the time gap can depend on the sub-carrier spacing used for SL transmissions and receptions. In one example, the time gap can be pre-configured or configured/update by RRC signaling and/or MAC CE signaling and/or L1 control signaling.

FIG. 19 illustrates yet another example of resource allocation for SL positioning reference signal 1900 according to embodiments of the present disclosure. An embodiment of the resource allocation for SL positioning reference signal 1900 shown in FIG. 19 is for illustration only.

In one example, the resources used for the SCI and the corresponding SL positioning reference signal are frequency division multiplexed as shown in Examples 1, 2, 3, and 4 of FIG. 19.

In Example 1 of FIG. 19, the same time allocation is used for SCI and SL positioning reference signals. There is no frequency gap between the resource blocks (RBs) used for SCI and the RBs used for SL positioning reference signal. In one example, there is an AGC symbol before the first symbol of the SCI and SL positioning reference signal. In one example, there is no AGC symbol before the first symbol of the SCI and SL positioning reference signal. An AGC symbol is a duplicate symbol of the following symbol.

In Example 2 of FIG. 19, the same time allocation is used for SCI and SL positioning reference signals. There is a frequency gap between the RBs used for SCI and the RBs used for SL positioning reference signal. In one example, there is an AGC symbol before the first symbol of the SCI and SL positioning reference signal. In one example, there is no AGC symbol before the first symbol of the SCI and SL positioning reference signal. An AGC symbol is a duplicate symbol of the following symbol. In one example, the frequency gap can depend on a UE capability. In one example, the frequency gap can depend on the sub-carrier spacing used for SL transmissions and receptions. In one example, the frequency gap can be pre-configured or con-figured/update by RRC signaling and/or MAC CE signaling and/or L1 control signaling.

In Example 3 of FIG. 19, a different time allocation is used for SCI and SL positioning reference signals. In one sub-example (shown in FIG. 19 example 3), the SCI and SL positioning reference signal start at the same symbol. In one sub-example, the SCI and SL positioning reference signal end at the same symbol. In a one sub-example, the SCI and SL positioning reference signal neither start nor end at the same symbol. There is no frequency gap between the SL symbols used for SCI and the SL symbols used for SL positioning reference signal. In one example, there is an AGC symbol before the first symbol of the SCI and/or SL positioning reference signal. In one example, there is no AGC symbol before the first symbol of the SCI SL positioning reference signal. An AGC symbol is a duplicate symbol of the following symbol.

In Example 4 of FIG. 19, a different time allocation is used for SCI and SL positioning reference signals. In one sub-example (shown in FIG. 19 Example 4), the SCI and SL positioning reference signal start at the same symbol. In one sub-example, the SCI and SL positioning reference signal end at the same symbol. In a one sub-example, the SCI and SL positioning reference signal neither start nor end at the same symbol. There is a frequency gap between the SL symbols used for SCI and the SL symbols used for SL positioning reference signal. In one example, there is an AGC symbol before the first symbol of the SCI and/or SL positioning reference signal. In one example, there is no AGC symbol before the first symbol of the SCI and/or SL positioning reference signal. An AGC symbol is a duplicate symbol of the following symbol. In one example, the frequency gap can depend on a UE capability. In one example, the frequency gap can depend on the sub-carrier spacing used for SL transmissions and receptions. In one example, the frequency gap can be pre-configured or con-figured/update by RRC signaling and/or MAC CE signaling and/or L1 control signaling.

FIG. 20 illustrates yet another example of resource allocation for SL positioning reference signal 2000 according to embodiments of the present disclosure. An embodiment of the resource allocation for SL positioning reference signal 2000 shown in FIG. 20 is for illustration only.

In one example, the resources used for the SCI and the corresponding SL positioning reference signal are time and frequency division multiplexed as shown in FIG. 20.

In one example, one or more instances of SL positioning reference signal are associated with SCI signaling and/or MAC CE signaling and/or RRC signaling, from a first SL UE, which informs of a second SL UE about resources allocated for the transmissions or reception of SL positioning reference signal and corresponding configuration parameters.

In one example, the instances allocated for the transmission or reception of SL positioning reference signals are allocated periodically.

In another example, the instances allocated for the transmission or reception of SL positioning reference signals are allocated semi-persistently. A first signal from the first SL UE configures the resources that can be used for the transmission or reception of SL positioning reference signal on the SL interface (PC5 interface). A second signal from the first SL UE activates the use of the resources for the transmission or reception of SL positioning reference signal. The first and second signal can be the same signal or in the same signal, e.g., the signal that configures the resources that can be used for SL positioning reference signal on the SL interface (PC5 interface) also activates these resource for transmission or reception. A third signal from the first SL UE deactivates the use of the resources for the transmission or reception of SL positioning reference signal. In one example, a first signal can be an RRC signal, and a second and third signals can be MAC CE signals. In one example, a first signal can be RRC signal or MAC CE signal, and a second and third signals can be L1 control signals (e.g., first stage SCI and/or second stage SCI).

In another example, the instance(s) allocated for the transmission of SL positioning reference signal are allocated aperiodically. A signal from the first SL UE to the second SL UE can allocate 1 or N instances of resources for the transmission or reception of SL positioning reference signal. N can be specified in the system specification, pre-configured or configured/updated by RRC signaling and/or MAC CE signaling and/or L1 control signaling. If not configured, a default value is used for N.

In one example, the signal or signals configuring or activating or deactivating the SL positioning reference signal are transmitted by a first SL UE and the SL positioning reference signal is transmitted by the first SL UE.

In one example, the signal or signals configuring or activating or deactivating the SL positioning reference signal are transmitted by a first SL UE and the SL positioning reference signal is transmitted by the second SL UE.

In one example, the signal reporting SL positioning measurements is transmitted or received in the same resource pool as the SL data and SL positioning reference signals.

In one example, the signal reporting SL positioning measurements is transmitted or received in the same resource pool as the SL data but not configured for the transmission or reception of SL positioning reference signals.

In another example, the signal reporting SL positioning measurements is transmitted or received in a resource pool configured for the transmission or reception of SL positioning reference signals but not SL data.

In one example, the RRC signaling and/or MAC CE signaling and/or L1 control signaling (e.g., SCI) informing a SL UE receiving or transmitting the SL positioning measurements about the SL positioning measurements configuration is transmitted or received in the same resource pool as the SL positioning measurements.

In another example, the RRC signaling and/or MAC CE signaling and/or L1 control signaling (e.g., SCI) informing a SL UE receiving or transmitting the SL positioning measurements about the SL positioning measurements configuration is transmitted or received in a resource pool different from the resource pool in which the SL positioning measurements is transmitted or received.

In one example, one or more instances of resources used for SL positioning measurements are associated with SCI that informs the second UE about resource(s) of SL positioning measurements and corresponding configuration parameters.

FIG. 21 illustrates yet another example of resource allocation for SL positioning measurement report resources 2100 according to embodiments of the present disclosure. An embodiment of the resource allocation for SL positioning measurement report 2100 shown in FIG. 21 is for illustration only.

In one example, the SCI is transmitted e.g., on PSCCH and/or PSSCH in the same slot as the SL positioning measurements. This is illustrated by way of example in FIG. 21.

FIG. 22 illustrates yet another example of resource allocation for SL positioning measurement report resources 2200 according to embodiments of the present disclosure. An embodiment of the resource allocation for SL positioning measurement report 2200 shown in FIG. 22 is for illustration only.

In another example, the SCI is transmitted e.g., on PSCCH and/or PSSCH in a slot different from the slot the SL positioning measurements is transmitted in. This is illustrated by way of example in FIG. 22.

FIG. 23 illustrates yet another example of resource allocation for SL positioning measurement report resources 2300 according to embodiments of the present disclosure. An embodiment of the resource allocation for SL positioning measurement report 2300 shown in FIG. 23 is for illustration only.

In another example, the SCI is transmitted e.g., on PSCCH and/or PSSCH in a slot different from the slots the SL positioning measurements are transmitted in. There are multiple (N) instances of the SL positioning measurements indicated in the SCI. In one example, N is indicated in the SCI. In another example, N can be specified in the system specification, pre-configured or configured/updated by RRC signaling and/or MAC CE signaling and/or L1 control signaling. If not configured, a default value is used for N. This is illustrated by way of example in FIG. 23.

In one example, the SL positioning measurements are reported in SL control information (e.g., second stage SCI or PSSCH and/or first stage SCI on PSCCH).

In another example, the SL positioning measurements are reported in PC5 MAC CE signal.

In another example, the SL positioning measurements are reported in PC5 RRC signal.

In another example, the SL positioning measurements are reported using a combination of all or some of PC5 RRC signaling, PC5 MAC CE signaling and/or L1 control (e.g., second stage SCI or PSSCH and/or first stage SCI on PSCCH) signaling.

In one example, the SCI is transmitted by a first SL UE (that indicates resources for SL positioning measurements) and the SL positioning reference signal is transmitted by the first SL UE.

In another example, the SCI is transmitted by a first SL UE (that indicates resources for SL positioning measurements) and the SL positioning measurement is transmitted by a second SL UE. To maintain causality in this example, the symbols/slots allocated to the SL positioning measurement reporting occur after the symbols/slots used for the corresponding SCI. There can additionally be a time gap between the SCI and the corresponding SL positioning measurement reporting resources (e.g., to account for propagation delay and processing time and Rx/Tx switching time at the second UE). In one example, the time gap can depend on a UE capability. In one example, the minimum time gap can depend on the sub-carrier spacing used for SL transmissions and receptions. In one example, the time gap can be pre-configured or configured/update by RRC signaling and/or MAC CE signaling and/or L1 control signaling.

In one example, the SCI is transmitted by a first SL UE, wherein the SCI indicates resources for SL positioning reference signal and reporting of SL positioning measurements. The SL positioning reference signal is transmitted by the first SL UE. The SL positioning measurement is transmitted by a second SL UE. To maintain causality in this example, the symbols/slots allocated to the SL positioning measurement reporting occur after the symbols/slots used for the corresponding resources for SL positioning reference signal. There can additionally be a time gap between the resources of SL positioning reference signal and the corresponding SL positioning measurement reporting resources (e.g., to account for processing time and Rx/Tx switching time at the second UE). In one example, the minimum time gap can depend on a UE capability. In one example, the time gap can depend on the sub-carrier spacing used for SL transmissions and receptions. In one example, the time gap can be pre-configured or configured/update by RRC signaling and/or MAC CE signaling and/or L1 control signaling.

In one example, one or more instances of resources used for SL positioning measurements are associated with SCI signaling and/or MAC CE signaling and/or RRC signaling, from a first SL UE, which informs of a second SL UE about resources allocated for the transmissions or reception of SL positioning measurements and corresponding configuration parameters.

In one example, the instances allocated for the transmission or reception of SL positioning measurements are allocated periodically.

In another example, the instances allocated for the transmission or reception of SL positioning measurements are allocated semi-persistently. A first signal from the first SL UE configures the resources that can be used for the transmission or reception of SL positioning measurements on the SL interface (PC5 interface). A second signal from the first SL UE activates the use of the resources for the transmission or reception of SL positioning measurements. The first and second signal can be the same signal or in the same signal, e.g., the signal that configures the resources that can be used for reporting SL positioning measurements on the SL interface (PC5 interface) also activates these resource for transmission or reception. A third signal from the first SL UE deactivates the use of the resources for the transmission or reception of SL positioning measurements. In one example, a first signal can be an RRC signal, and a second and third signals can be MAC CE signals. In one example, a first signal can be RRC signal or MAC CE signal, and a second and third signals can be L1 control signals (e.g., first stage SCI and/or second stage SCI).

In another example, the instance(s) allocated for the transmission of SL positioning measurements are allocated aperiodically. A signal from the first SL UE to the second SL UE can allocate 1 or N instances of resources for the transmission or reception of SL positioning measurements. N can be specified in the system specification, pre-configured or configured/updated by RRC signaling and/or MAC CE signaling and/or L1 control signaling. If not configured, a default value is used for N.

In one example, the SL positioning measurements are reported in SL control information (e.g., second stage SCI or PSSCH and/or first stage SCI on PSCCH).

In another example, the SL positioning measurements are reported in PC5 MAC CE signal.

In another example, the SL positioning measurements are reported in PC5 RRC signal.

In another example, the SL positioning measurements are reported using a combination of all or some of PC5 RRC signaling, PC5 MAC CE signaling and/or L1 control (e.g., second stage SCI or PSSCH and/or first stage SCI on PSCCH) signaling.

In one example, the signal or signals configuring or activating or deactivating the resources for reporting SL positioning measurements are transmitted by a first SL UE and the SL positioning measurements are transmitted by the first SL UE.

In one example, the signal or signals configuring or activating or deactivating the resources for reporting SL positioning measurements are transmitted by a first SL UE and the SL positioning measurements are transmitted by the second SL UE.

In one example, the signal or signals configuring or activating or deactivating the resources for SL positioning reference signal and reporting of SL positioning measurements are transmitted by a first UE. The SL positioning reference signal is transmitted by the first SL UE. The SL positioning measurement is transmitted by a second SL UE. To maintain causality in this example, the symbols/slots allocated to the SL positioning measurement reporting occur after the symbols/slots used for the corresponding resources for SL positioning reference signal. There can additionally be a time gap between the resources of SL positioning reference signal and the corresponding SL positioning measurement reporting resources (e.g., to account for processing time and Rx/Tx switching time at the second UE). In one example, the minimum time gap can depend on a UE capability. In one example, the time gap can depend on the sub-carrier spacing used for SL transmissions and receptions. In one example, the time gap can be pre-configured or configured/update by RRC signaling and/or MAC CE signaling and/or L1 control signaling.

The present disclosure provides: (1) signaling of SL resources to be used for SL positioning reference signal; and (2) signaling of SL resources to be used for reporting SL positioning measurements. The present disclosure is directed to the NR standard.

SL is one of the promising features of NR, targeting verticals such the automotive industry, public safety, industrial internet of things (IIoT) and other commercial applications. SL has been first introduced to NR in release 16, with emphasis on V2X and public safety where the requirements are met. The support of SL has been expanded to other types of UEs such a vulnerable road users (VRUs), pedestrian UEs (PUEs) and other types of handheld devices, by supporting mechanisms for power saving for SL resource allocation as well as mechanisms that enhance reliability and reduce latency of SL transmissions.

Another feature that NR supports is positioning, using the NR radio interface for performing positioning measurements to determine or assist in determining the location of a UE. NR positioning was first introduced using the Uu interface in Rel-16, and further enhanced for improved accuracy and reduced latency in Rel-17. In Rel-18 a new Study Item followed by a Work Item has been discussed to study and evaluate performance and feasibility of potential solutions for SL positioning. In this disclosure, methods and signaling are provided for a network configuration of SL resources to be used for SL positioning reference signal and reporting of SL positioning measurements.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first user equipment (UE), comprising:
a transceiver; and
at least one processor operably coupled to the transceiver, the at least one processor configured to:
   receive, from a base station, configuration information for a sidelink (SL) positioning reference signal (PRS),
   identify resources information for the SL PRS based on the configuration information,
   transmit, to a second UE, the resources information for the SL PRS, and
   transmit, to the second UE, the SL PRS based on the resources information,
   wherein the resources information is identified based on downlink control information (DCI), and
   wherein a number of instances of the resources information for the SL PRS is configured to 2 or 3.

2. The first UE of claim 1,
wherein the resources information is transmitted by a sidelink control information (SCI) using a physical sidelink control channel (PSCCH) or a physical sidelink shared channel (PSSCH).

3. The first UE of claim 2,
wherein the SCI and SL PRS associated with the SCI are transmitted in the same slot, and
wherein the SCI and the SL PRS associated with the SCI are time division multiplexed.

4. The first UE of claim 1,
wherein the configuration information relates to a report of a SL positioning measurement, and wherein the resources information relates to the report of the SL positioning measurement.

5. The first UE of claim 4,
wherein the at least one processor is further configured to:
receive, from the second UE, information on the SL positioning measurement.

6. The first UE of claim 1,
wherein the configuration information include at least one of SL reference signal time difference (RSTD), SL reference signal receive power (RSRP), SL angle of arrival (AoA) of the SL PRS, or reception-transmission (Rx-Tx) time difference.

7. A method performed by a user equipment (UE), the method comprising:
receiving, from a base station, configuration information for a sidelink (SL) positioning reference signal (PRS);
identifying resources for the SL PRS based on the configuration information;
transmitting, to a second UE, the resources information for the SL PRS; and
transmitting, to the second UE, the SL PRS based on the resources information,
wherein the resources information is identified based on downlink control information (DCI), and
wherein a number of instances of the resources information for the SL PRS is configured to 2 or 3.

8. The method of claim 7,
wherein the configuration information relates to a report of a SL positioning measurement, and
wherein the resources information relates to the report of the SL positioning measurement.

9. The method of claim 7, further comprising:
receiving, from the second UE, information on SL positioning measurement.

10. A second user equipment (UE), comprising:
a transceiver; and
at least one processor operably coupled to the transceiver, the at least one processor configured to:
   receive, from a first UE, resources information for a sidelink (SL) positioning reference signal (PRS), and
   receive, from the first UE, the SL PRS based on the resources information,
   wherein the resources information is identified based on downlink control information (DCI), and
   wherein a number of instances of the resources information for the SL PRS is configured to 2 or 3.

11. The second UE of claim 10,
wherein the at least one processor is further configured to:
perform a SL positioning measurement based on the received SL PRS, and
transmit, to the first UE, information on the SL positioning measurement.

12. A method performed by a second user equipment (UE), the method comprising:
receiving, from a first UE, resources information for a sidelink (SL) positioning reference signal (PRS); and
receiving, from the first UE, the SL PRS based on the resources information,
wherein the resources information is identified based on downlink control information (DCI), and
wherein a number of instances of the resources information for the SL PRS is configured to 2 or 3.

* * * * *